(12) United States Patent
Egami

(10) Patent No.: US 11,146,028 B2
(45) Date of Patent: Oct. 12, 2021

(54) PROTECTOR-EQUIPPED WIRE HARNESS

(71) Applicant: Sumitomo Wiring Systems, Ltd., Mie (JP)

(72) Inventor: Tomohiro Egami, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/499,920

(22) PCT Filed: Mar. 23, 2018

(86) PCT No.: PCT/JP2018/011589
§ 371 (c)(1),
(2) Date: Oct. 1, 2019

(87) PCT Pub. No.: WO2018/190100
PCT Pub. Date: Oct. 18, 2018

(65) Prior Publication Data
US 2020/0119501 A1    Apr. 16, 2020

(30) Foreign Application Priority Data
Apr. 12, 2017  (JP) .............................. JP2017-079103

(51) Int. Cl.
*H01R 13/58* (2006.01)
*H01R 13/74* (2006.01)
(Continued)

(52) U.S. Cl.
CPC ......... *H01R 13/74* (2013.01); *B60R 16/0215* (2013.01); *H01R 13/50* (2013.01);
(Continued)

(58) Field of Classification Search
CPC .............. H01R 13/506; H01R 13/5829; H01R 13/2512; H01R 13/595; H02B 1/202
(Continued)

(56) References Cited

U.S. PATENT DOCUMENTS 3,771,104 A * 11/1973 Clark ................... H01R 4/2487
439/415
5,908,327 A * 6/1999 Tsuji .................... H01R 13/506
439/470
(Continued)

FOREIGN PATENT DOCUMENTS

JP     03-007612 U    1/1991
JP     05-041328 U    6/1993
(Continued)

OTHER PUBLICATIONS

International Search Report dated May 1, 2018 for WO 2018/190100 A1.

*Primary Examiner* — Thanh Tam T Le
(74) *Attorney, Agent, or Firm* — Abelman, Frayne & Schwab

(57) ABSTRACT

A protector-equipped wire harness includes: an electrical wire; a protector that includes a plate-shaped portion, a slide supporting portion formed so as to extend inward in a first direction from one edge portion of the plate-shaped portion, and a receiver that is provided on a far side with respect to the slide supporting portion, the protector being disposed so as to cover at least a portion of an outer circumferential surface of the electrical wire; and an attachment member that includes a slidable member that includes a slidable portion supported by the slide supporting portion so as to be slidable in the first direction, the attachment member being provided with a harness-related component or a component attachment portion for a harness-related component. The protector and the attachment member are fixed to each other in a state where the slidable member of the attachment member is in contact with the receiver.

9 Claims, 18 Drawing Sheets

(51) Int. Cl.
*B60R 16/02* (2006.01)
*H01R 13/50* (2006.01)
*H02G 3/04* (2006.01)

(52) U.S. Cl.
CPC ......... *H02G 3/0418* (2013.01); *H02G 3/0437* (2013.01); *H01R 2201/26* (2013.01)

(58) Field of Classification Search
USPC ................. 439/465–467, 470, 473; 361/826
See application file for complete search history.

(56) References Cited

U.S. PATENT DOCUMENTS

| | | | | |
|---|---|---|---|---|
| 5,967,830 A * | 10/1999 | Tsuji | ................... | H01R 13/506 439/467 |
| 6,019,638 A * | 2/2000 | Saka | ................. | H01R 13/7197 439/470 |
| 6,250,952 B1 * | 6/2001 | Shiga | ...................... | F42B 3/188 439/466 |
| 6,796,808 B2 * | 9/2004 | Hosoe | ................... | H01R 9/226 361/826 |
| 6,962,504 B2 * | 11/2005 | Fukui | .................. | H01R 13/562 439/466 |
| 7,021,959 B2 * | 4/2006 | Tsuji | .................... | H01R 13/562 439/470 |
| 7,507,108 B2 * | 3/2009 | Tsuji | .................. | H01R 13/5841 439/446 |
| 8,435,068 B2 * | 5/2013 | Oomori | ................ | H01R 13/506 439/465 |
| 8,568,159 B2 * | 10/2013 | Noda | ................. | H01R 13/5812 439/470 |
| 8,834,196 B2 * | 9/2014 | Duran | ................ | H01R 13/5829 439/459 |
| 8,951,062 B2 * | 2/2015 | Fleischmann | ........ | H01R 13/585 439/465 |
| 8,979,156 B2 * | 3/2015 | Mally | ................... | F16B 5/0657 296/1.08 |
| 9,184,542 B2 * | 11/2015 | Torii | ................. | H01R 13/5829 |
| 2014/0206242 A1 | 7/2014 | Torii et al. | | |
| 2016/0288733 A1 | 10/2016 | Akazawa et al. | | |

FOREIGN PATENT DOCUMENTS

| | | |
|---|---|---|
| JP | 06-060236 U | 8/1994 |
| JP | 09-121422 A | 5/1997 |
| JP | 2012-239305 A | 12/2012 |
| JP | 2013-143832 A | 7/2013 |

\* cited by examiner

PROTECTOR-EQUIPPED WIRE HARNESS

CROSS REFERENCE TO RELATED APPLICATIONS

This application is a national phase of PCT application No. PCT/JP2018/011589, filed on 23 Mar. 2018, which claims priority from Japanese patent application No. 2017-079103, filed on 12 Apr. 2017, all of which are incorporated herein by reference.

TECHNICAL FIELD

The present invention relates to a technique for fixing harness-related components to a protector for protecting electrical wires.

BACKGROUND

Patent Document 1 discloses a protector and a clamp for fixing electrical wires to the protector. According to the Patent Document 1, the clamp includes a band portion that is wound around the electrical wires, and a lock portion that fixes the electrical wires, which are tied together by the band portion, to the protector. The protector is provided with a lock hole that can be locked to the lock portion of the clamp.

PRIOR ART DOCUMENT

Patent Document

Patent Document 1: JP H09-121422A

SUMMARY OF THE INVENTION

Problems to be Solved

However, the lock hole according to Patent Document 1 is a through hole that penetrates through a surface of the protector. Therefore, when the lock portion is inserted into the lock hole, the lock portion of the clamp protrudes outward from the lock hole of the protector by a large length. In this case, there is concern that the lock portion of the clamp, which protrudes from the protector by a large length in a state of being mounted on a vehicle, will come into contact with members around the lock portion, and that an area in which the protector can be disposed is limited.

Therefore, in a structure for fixing components to a protector, the present invention aims to prevent a portion of the protector from protruding from the outer surface or inner surface of the protector by a large length.

Means to Solve the Problem

To solve the above-described problem, a protector-equipped wire harness according to a first aspect is a protector-equipped wire harness including: an electrical wire; a protector that includes a plate-shaped portion, a slide supporting portion formed so as to extend inward in a first direction from one edge portion of the plate-shaped portion, and a receiver that is provided on a far side with respect to the slide supporting portion, the protector being disposed so as to cover at least a portion of an outer circumferential surface of the electrical wire; and an attachment member that includes a slidable member that includes a slidable portion supported by the slide supporting portion so as to be slidable in the first direction, the attachment member being provided with a harness-related component or a component attachment portion for a harness-related component, wherein the protector and the attachment member are fixed to each other in a state where the slidable member of the attachment member is in contact with the receiver.

A second aspect is the protector-equipped wire harness according to the first aspect, wherein the attachment member is a member in which the harness-related component is formed integrally with the slidable member.

A third aspect is the protector-equipped wire harness according to the first aspect, wherein a slidable attachment portion that is slidable relative to, and attachable to, the harness-related component is formed integrally with the attachment member.

A fourth aspect is the protector-equipped wire harness according to the first aspect, wherein the harness-related component is a connector, and the attachment member is provided with the connector or a component attachment portion that is attachable to the connector.

A fifth aspect is the protector-equipped wire harness according to the first aspect, wherein the harness-related component is a vehicle fixing portion that is fixable to a vehicle, and the attachment member is provided with the vehicle fixing portion or a component attachment portion that is attachable to the vehicle fixing portion.

A sixth aspect is the protector-equipped wire harness according to the first aspect, wherein the harness-related component is an electrical wire, and the attachment member is provided with an elongated electrical wire attachment portion that can be disposed along the electrical wire and can be attached to the electrical wire, using a binding member, the elongated electrical wire attachment portion being the component attachment portion.

A seventh aspect is the protector-equipped wire harness according to any one of the first to sixth aspects, wherein the protector includes a retaining protrusion that is locked to the slidable member from a side to prevent the slidable portion from coming loose from the slide supporting portion in a state where the slidable member is in contact with the receiver.

An eighth aspect is the protector-equipped wire harness according to any one of the first to seventh aspects, wherein the slide supporting portion includes at least one of a pair of edge portions that are located opposite to each other with respect to a slit that extends in the first direction, the slidable portion is supported so as to be slidable in the first direction relative to at least one of the pair of edge portions, and the protector-equipped wire harness further includes a coupling portion that couples the pair of edge portions, which are located opposite to each other with respect to the slit, to each other at a position that is away from a trajectory of the slidable portion sliding on the slide supporting portion.

A ninth aspect is the protector-equipped wire harness according to the eighth aspect, wherein the slidable member is provided with a lock protrusion that is locked to the coupling portion from a side to prevent the slidable portion from coming loose from the slide supporting portion in a state where the slidable member is in contact with the receiver.

A tenth aspect is the protector-equipped wire harness according to any one of the first to ninth aspects, wherein the slide supporting portion includes at least one of a pair of edge portions that are located opposite to each other with respect to a slit that extends in the first direction, and the slidable portion constitutes a recessed groove that is recessed so as to allow one of the pair of edge portions to pass therethrough, and includes at least one of a pair of slidable side walls that are provided on both sides of the recessed groove.

An eleventh aspect is the protector-equipped wire harness according to the tenth aspect, wherein at least one slidable side wall of the pair of slidable side walls of the slidable portion is formed such that a base end-side portion of the slidable side wall is thinner than a leading end-side portion of the slidable side wall.

A twelfth aspect is the protector-equipped wire harness according to any one of the first to eleventh aspects, wherein the protector includes a bottom and a pair of side walls that protrude from the bottom, at least one of the pair of side walls serves as the plate-shaped portion on which the slide supporting portion is provided so as to extend in the first direction from a leading end-side portion of the side wall toward the side wall, and the electrical wire is disposed in a groove that is defined by the bottom and the pair of side walls.

A thirteenth aspect is the protector-equipped wire harness according to the twelfth aspect, wherein the protector further includes a lid that covers the groove from a side that is opposite to the bottom side with respect to the groove, and the lid includes a gripping portion that sandwiches the pair of edge portions from an inner surface side and an outer surface side of a side wall.

A fourteenth aspect is the protector-equipped wire harness according to any one of the first to thirteenth aspects, wherein a portion of the plate-shaped portion, on which the slide supporting portion is provided, protrudes more outward compared to portions on both sides of the portion on which the slide supporting portion is provided.

Effect of the Invention

According to the first aspect, the slidable portion of the attachment member is moved to slide in the first direction on the slide supporting portion formed at the plate-shaped portion of the protector, and the protector and the attachment member are fixed to each other in a state where the slidable member is in contact with the receiver. In this case, there is no need to use a conventional clamp or the like to fix the protector and the attachment member to each other. Therefore, in a structure for fixing components to the protector, it is possible to prevent a portion of the protector from protruding from the outer surface or inner surface of the protector by a large length.

According to the second aspect, the harness-related component that is formed integrally with the slidable member can be attached to the protector.

According to the third aspect, the slidable member can be easily attached to the harness-related component, using the slidable attachment portion.

According to the fourth aspect, the connector can be easily attached to the protector.

According to the fifth aspect, the vehicle fixing portion can be easily attached to the protector.

According to the sixth aspect, the elongated electrical wire attachment portion is disposed along the electrical wire and is bound together with the electrical wire, and thus a predetermined position of the electrical wire in the direction in which the electrical wire extends can be attached to the protector.

Also, according to the seventh and eleventh aspects, the protector includes a retaining protrusion, and therefore the slidable portion is prevented from moving in the direction opposite the first direction and coming loose from the slide supporting portion. As a result, the protector and the attachment member are prevented from being released from the state of being fixed to each other.

According to the eighth aspect, the pair of edge portions that are opposite to each other with respect to the slit are coupled to each other by the coupling portion. Therefore, the pair of edge portions are less likely to open, and the slidable portion is less likely to come loose from the slide supporting portion.

According to the ninth aspect, the slidable member is provided with the lock protrusion that is locked to the coupling portion, and therefore the slidable portion is prevented from moving in the direction opposite the first direction and coming loose from the slide supporting portion. As a result, the protector and the attachment member are prevented from being released from the state of being fixed to each other.

According to the tenth aspect, the slide supporting portion includes at least one of a pair of edge portions that are located opposite to each other with respect to a slit that extends in the first direction, and the slidable portion includes a recessed groove that is recessed so as to allow one of the pair of edge portions to pass therethrough. In this case, it is possible to fix the protector and the attachment member to each other using the slide supporting portion and the slidable portion, which have a simple configuration including the slit that is formed in the plate-shaped portion and the recessed groove that is recessed so as to allow at least one of the pair of edge portions that are located opposite to each other with respect to the slit to pass therethrough.

According to the eleventh aspect, the slidable portion includes a pair of slidable side walls that constitute the recessed groove. The slidable side walls are formed such that base end-side portions of the slidable side walls are thinner than leading end-side portions of the slidable side walls. Thus, the recessed groove is formed such that the width of a base end-side portion of the recessed groove with respect to the base ends of the slidable side walls is larger than the width of a leading end-side portion of the recessed groove with respect to the leading ends of the slidable side walls. In this case, when the slide supporting portion allows the slidable portion to be moved in the first direction, the recessed groove is likely to deform such that the width of the leading end-side portion thereof increases.

According to the twelfth aspect, the electrical wire is disposed in the groove that is defined by the bottom and the pair of side walls. Therefore, it is possible to sufficiently protect the electrical wire. Also, the protector includes the lid, and the lid includes the gripping portion that sandwiches the pair of edge portions from the inner surface side and the outer surface side of the side wall. That is, the gripping portion grips portions near the pair of edge portions, which are portions on both sides of the slit in the side wall, and thus the gripping portion prevents the portions near the pair of edge portions from deforming.

According to the thirteenth aspect, the protector includes the lid, and the lid includes the gripping portion that sandwiches the pair of edge portions from the inner surface side and the outer surface side of the side wall. That is, the gripping portion grips portions near the pair of edge portions, which are portions on both sides of the slit in the side wall, and thus the gripping portion prevents the portions near the pair of edge portions from deforming.

According to the fourteenth aspect, a portion of the plate-shaped portion, on which the slide supporting portion is provided, protrudes more outward compared to portions on both sides of the portion on which the slide supporting portion is provided. In this case, it is possible to reduce the width of the portions other than the portion of the protector on which the slide supporting portion is provided, and it is possible to reduce the space required for the protector-equipped wire harness.

DETAILED DESCRIPTION TO EXECUTE THE INVENTION

Figure 1:
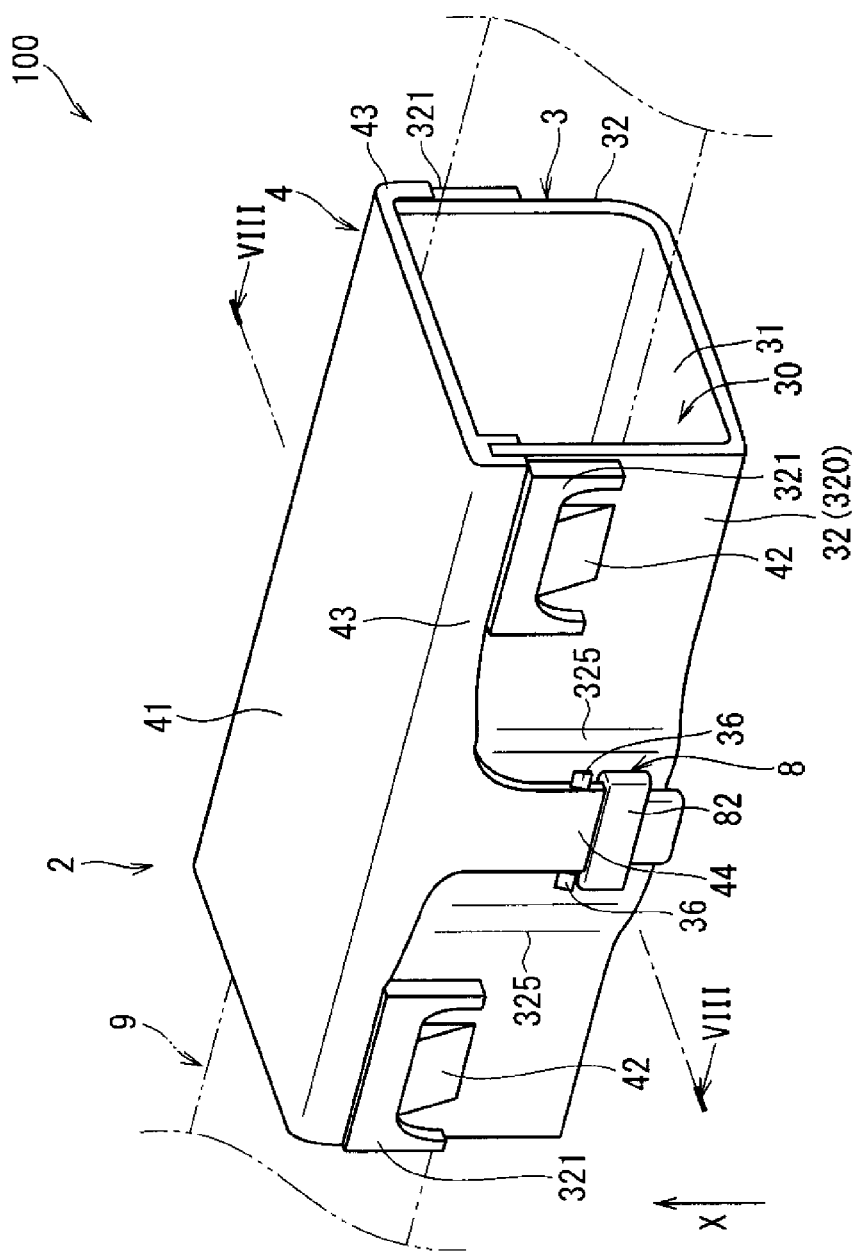
FIG. 1 is a perspective view of a protector-equipped wire harness according to a first embodiment.

The following describes embodiments with reference to the accompanying drawings.

First Embodiment

First, a protector-equipped wire harness 100 according to a first embodiment will be described with reference to FIGS. 1 to 8. The protector-equipped wire harness 100 includes an electrical wire 9, a protector 2, and an attachment member 8.

The protector 2 is disposed so as to cover at least a portion of the outer circumferential surface of the electrical wire 9, and includes a protector body 3 and a lid 4 in this example. Note that the protector body 3 includes a bottom 31 and a pair of side walls 32 that protrude from the bottom 31, and the bottom 31 and the pair of side walls 32 form a groove 30 in which the electrical wire 9 can be disposed. One of the pair of side walls 32 is an example of a plate-shaped portion of the protector 2. The lid 4 is a portion that covers the groove 30 from the side that is opposite to the bottom 31 with respect to the groove 30.

Figure 2:
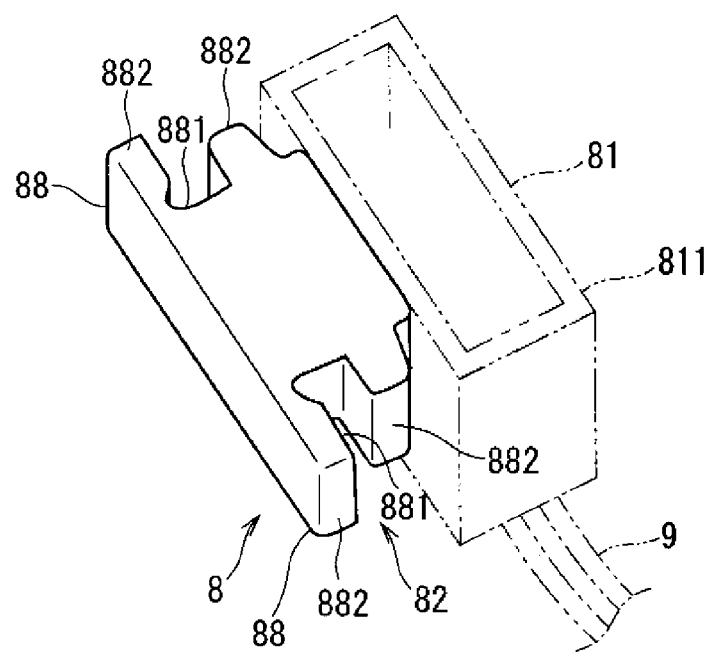
FIG. 2 is a schematic perspective view of an attachment member of the protector-equipped wire harness according to the first embodiment.
Figure 3:
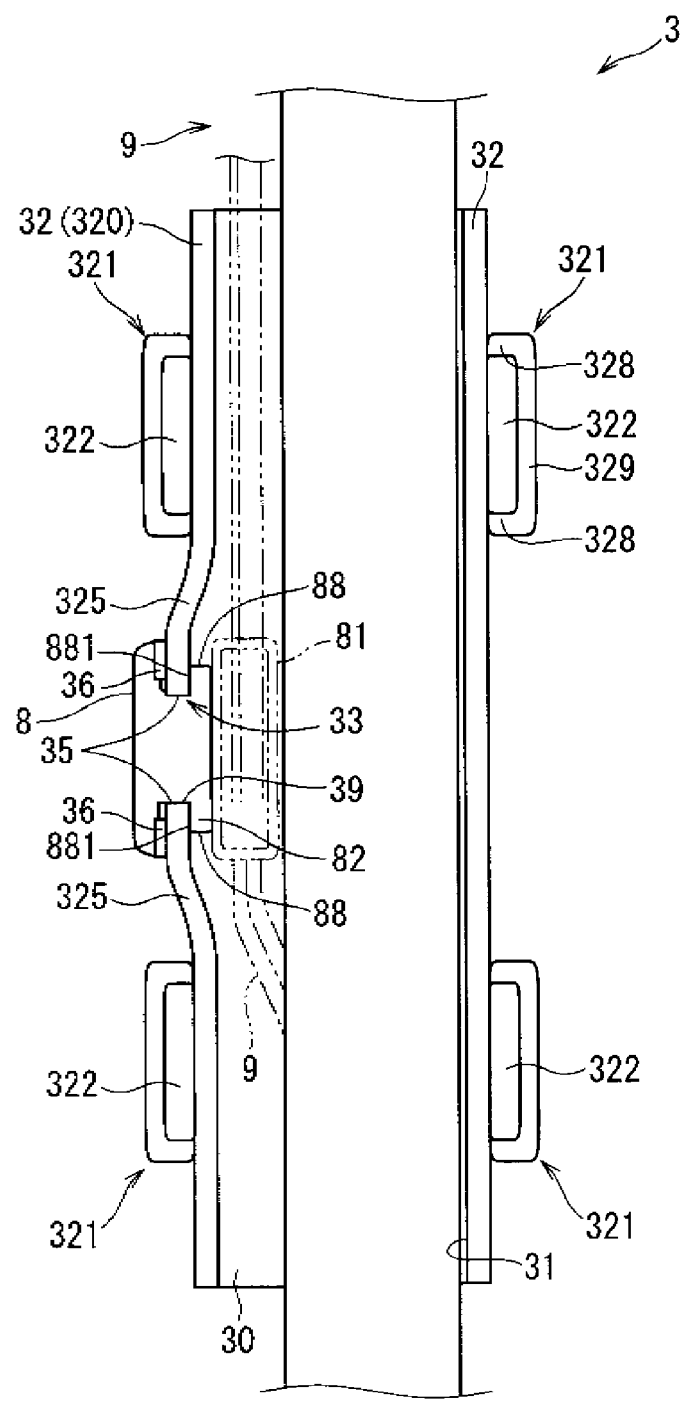
FIG. 3 is a plan view of a portion of a protector of the protector-equipped wire harness according to the first embodiment and an electrical wire.
Figure 4:
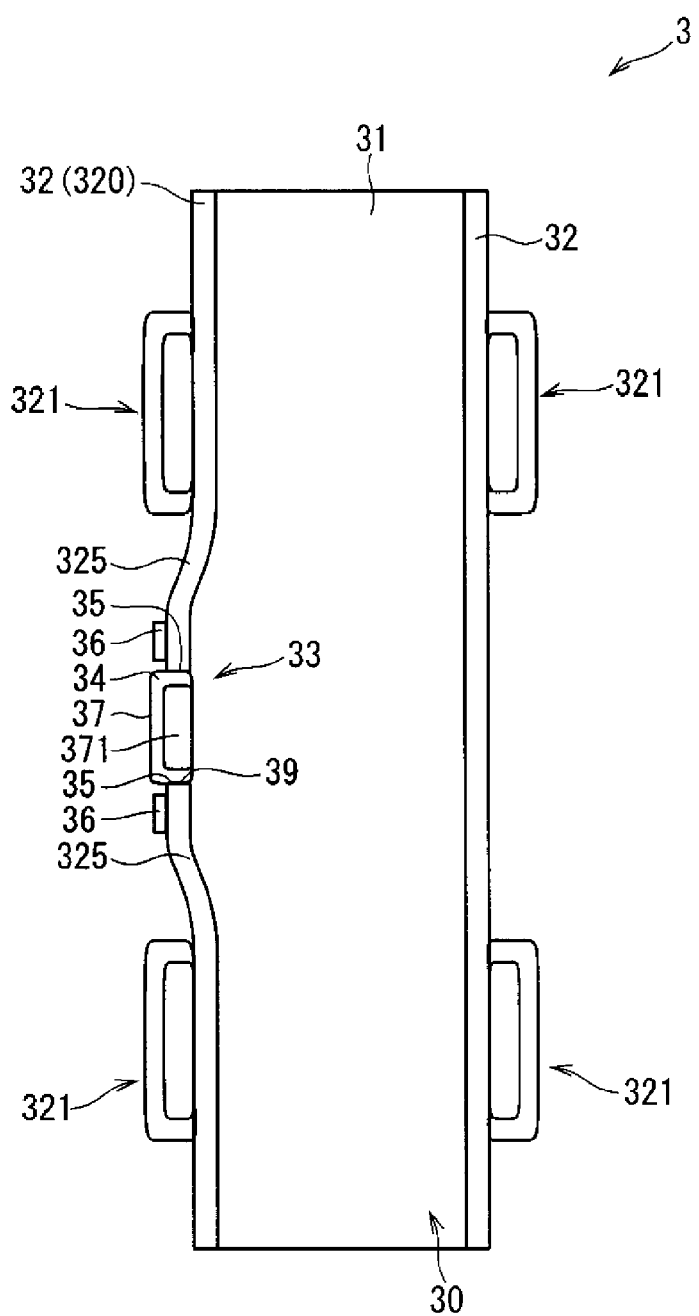
FIG. 4 is a plan view of a portion of the protector of the protector-equipped wire harness according to the first embodiment.
Figure 5:
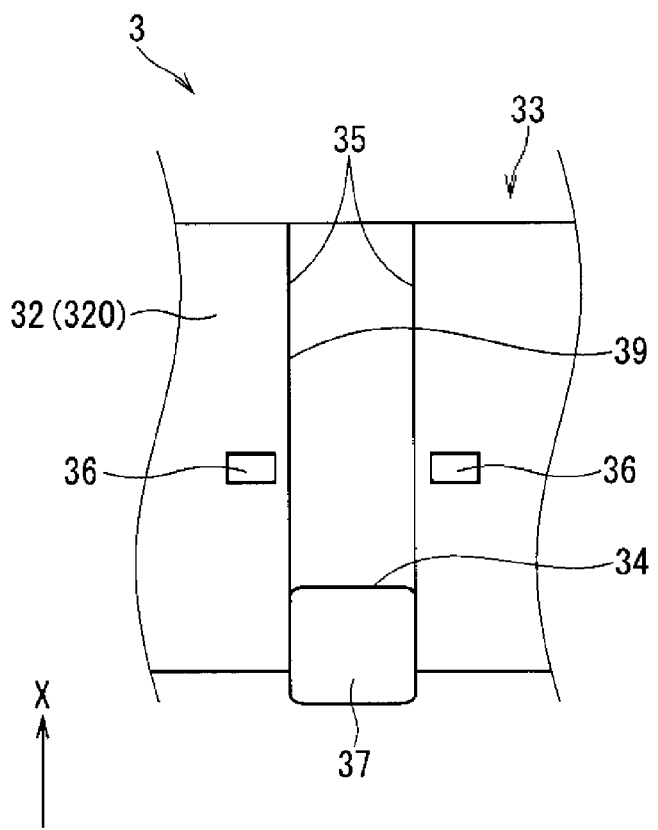
FIG. 5 is a side view of a portion of the protector of the protector-equipped wire harness according to the first embodiment.
Figure 6:
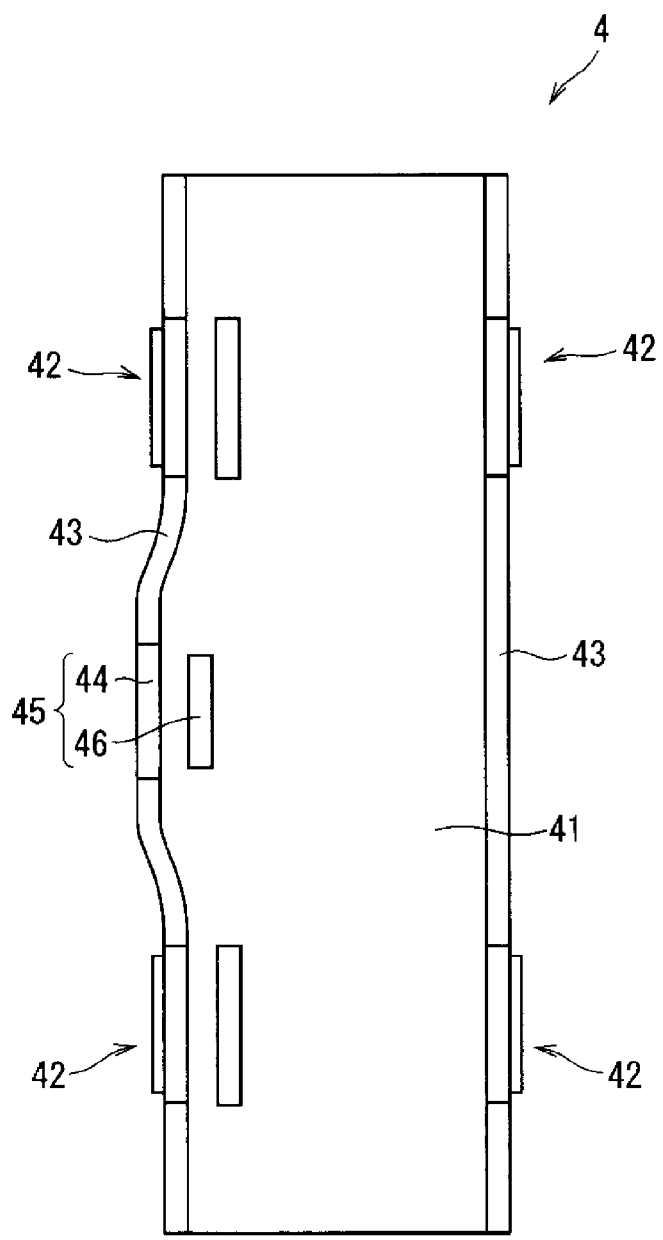
FIG. 6 is a plan view of a portion of the protector of the protector-equipped wire harness according to the first embodiment.
Figure 7:
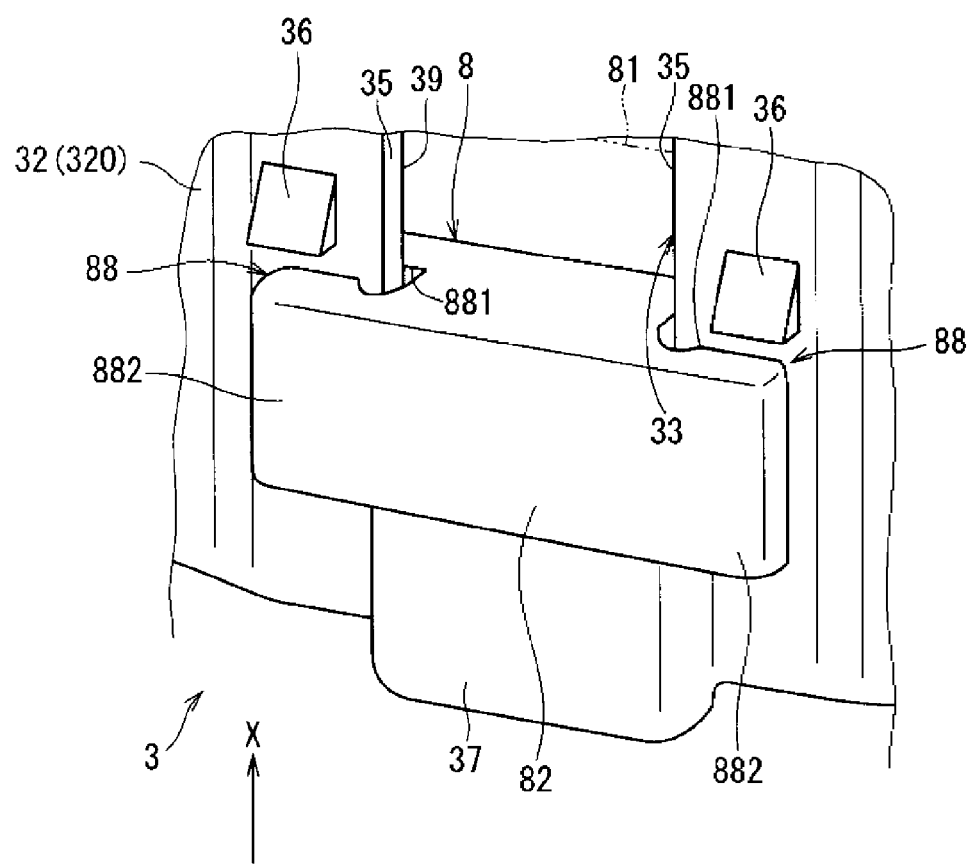
FIG. 7 is a partially enlarged perspective view of the protector-equipped wire harness according to the first embodiment.
Figure 8:
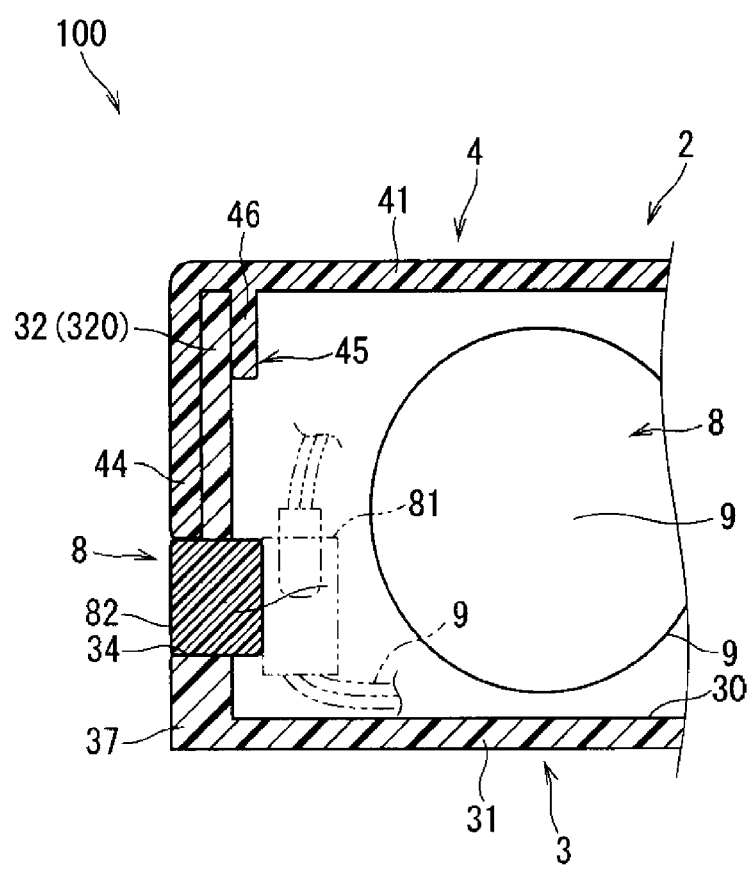
FIG. 8 is a cross-sectional view of the protector-equipped wire harness according to the first embodiment.

FIG. 1 is a perspective view of the protector-equipped wire harness 100. In FIG. 1, the electrical wire 9 is indicated by imaginary lines (two-dot chain lines). FIG. 2 is a schematic perspective view of the attachment member 8. FIG. 3 is a plan view of a portion of the protector 2, and is specifically a plan view of the protector body 3 in which the electrical wire 9 is disposed. FIG. 4 is a plan view of a portion of the protector 2, and is specifically a plan view of the protector body 3. FIG. 5 is a side view of a portion of the protector 2, and is specifically a side view of the protector body 3. FIG. 6 is a plan view of a portion of the protector 2, and is specifically a plan view of the lid 4. Note that FIG. 6 shows the back side of the lid 4 (the bottom 31 side when the lid 4 is attached to the protector body 3). FIG. 7 is a partially enlarged view of the protector-equipped wire harness 100 in FIG. 1, and is specifically a partially enlarge perspective view in which a portion of the protector 2 and a portion of the attachment member 8 in a state where the protector 2 and the attachment member 8 are fixed are enlarged. FIG. 8 is a cross-sectional view of the protector-equipped wire harness 100. Note that FIG. 8 is a cross-sectional view along a line VIII-VIII in FIG. 1.

First, the attachment member 8 will be described. In the present embodiment, as shown in FIG. 2 and so on, the attachment member 8 includes a slidable member 82 that includes slidable portions 88 that are supported by a slide supporting portion 33 so as to be slidable in a first direction X, and the attachment member 8 is provided with a harness-related component, or a component attachment portion for a harness-related component. The following describes an example in which the harness-related component is a connector 81, and the attachment member 8 is provided with the connector 81. Other examples of the harness related component, and an example in which the component attachment portion for the harness-related component is provided will be described in modifications described below.

The attachment member 8 is a member in which the slidable member 82 and a connector housing portion that constitutes the connector 81 are molded integrally with each other by, for example, pouring resin into a mold.

The connector 81 includes a connector housing 811 in which at least one cavity is formed.

In this example, the electrical wire 9 may be insulated electrical wires that each include a core that is mainly made of metal such as copper or aluminum, and an insulating coating that covers the core. The electrical wire 9 is constituted by a plurality of electrical wires 9, and at least one electrical wire 9 branches off from the other electrical wires 9 and is led into the connector 81. A terminal at an end of the at least one electrical wire 9 is inserted into, and held by, the cavity in the connector housing 811. A partner connector that is connected to the ends of the other electrical wire is connected to the connector 81, and thus the above-described at least one electrical wire 9 and the other electrical wires on the partner connector side are connected to each other.

As shown in FIGS. 2 and 8, the slidable member 82 includes the slidable portion 88. The slidable member 82 is formed so as to have a substantially rectangular parallelepiped shape, and the two end faces that are orthogonal to the first direction X are formed so as to be flat faces that are parallel with each other. The connector 81 is integrally provided on one main face of the slidable member 82, which is the face that faces toward the inside of the protector 2.

The slidable portions 88 are portions that are supported by the slide supporting portion 33 so as to be slidable in the first direction X. In this example, each slidable portion 88 includes a pair of slidable side walls 882 that define a recessed groove 881 that has a recessed shape. In the protector-equipped wire harness 100, the recessed grooves 881 penetrate through the slidable member 82 in the first direction X.

Also, in the present embodiment, at least one of the pair of slidable side walls 882 on both sides of the recessed groove 881 in each slidable portion 88 are formed such that a base end-side portion of the slidable side wall 882 is thinner than a leading end-side portion of the slidable side wall 882. In this example, a portion of the inner surface of one of each pair of slidable side walls 882 is recessed, and the width of a leading end-side portion of the recessed groove 881 with respect to the leading end of the slidable side wall 882 is smaller than the width of a base end-side portion of the recessed groove 881 with respect to the base end of the slidable side wall 882. In this case, leading end-side portions of the slidable side walls 882 can easily deform to increase the width of the recessed grooves 881.

Note that, in another example, a portion of the outer surfaces of each pair of slidable side walls may be recessed such that base end-side portions of the slidable side walls are thinner than lead end-side portions of the slidable side walls. If this is the case, the width of the recessed grooves is constant from the leading end portions to the base end portions of the slidable side walls, and leading end-side portions of the slidable side walls can easily deform to increase the width of the recessed grooves.

As shown in FIG. 2, in the present embodiment, the recessed grooves 881 are each provided on either one side of the slidable member 82. Therefore, in this example, the slidable portions 88 include two pairs of slidable side walls 882, each pair being provided on either one side of the slidable member 82. The respective openings of the two recessed grooves 881 provided on both sides of the slidable member 82 face opposite directions. This is because a pair of edge portions 35, which will be described later, are to be passed through the two recessed grooves 881 of the slidable portions 88. The details of the slidable portions 88 will be described later.

Next, the following describes the protector 2. The protector 2 is a member that covers the electrical wires 9 to protect the electrical wires 9. The protector 2 may be a member that is made of resin, for example. In this example, as shown in FIG. 1, the protector 2 has a shape that can protect a straight section of the electrical wires 9. However, the protector 2 may have a shape that can protect a curved section of the electrical wires 9, or a shape that can protect both a curved section and a straight section of the electrical wires 9, for example.

In the present embodiment, as shown in FIGS. 1 and 3 to 8, the protector 2 includes: the bottom 31; a pair of side walls 32 that protrude from the bottom 31; the slide supporting portion 33 that is provided for at least one of the pair of side walls 32 and is formed so as to extend in the first direction X, which is a direction from the leading ends of the side walls 32 to the bottom 31; a receiver 34 that is provided on a bottom 31-side portion of the slide supporting portion 33; and the lid 4. In the present embodiment, the protector 2 further includes retaining protrusions 36.

In this example, as shown in FIG. 1, the protector 2 includes the protector body 3 and the lid 4. As shown in FIGS. 1, 3, and 4, the protector body 3 includes the bottom 31, the pair of side walls 32, the slide supporting portion 33, the receiver 34, and the retaining protrusions 36. Also, in this example, the pair of side walls 32 are provided with first fixing portions 321 for fixing the lid 4 to the protector body 3.

First, the following describes the pair of side walls 32 of the protector 2. The pair of side walls 32 are formed so as to protrude from the bottom 31 toward the electrical wires 9 side. At least one of the pair of side walls 32 is provided with the slide supporting portion 33 and the receiver 34. In this example, one of the pair of side walls 32 is provided with the slide supporting portion 33 and the receiver 34. In the following description, the side wall 32 on which the slide supporting portion 33 and the receiver 34 are formed is referred to as "the one side wall 320". Also, in the present embodiment, the side walls 32 are provided with the first fixing portions 321 for fixing the lid 4, in addition to the slide supporting portion 33 and the receiver 34. The one side wall 320 is also provided with the retaining protrusions 36.

Note that, in another example, as a matter of course, a slide supporting portion and a receiver may be provided on both of the pair of side walls. For example, if two or more attachment members are provided for one electrical wire, and the respective slidable members of the two attachment members are located at opposite positions with respect to the electrical wire, the respective slidable portions of the two attachment members may be supported by the slide supporting portions provided on both of the pair of side walls.

Next, the following describes the slide supporting portion 33, the receiver 34, and the retaining protrusions 36 that are formed on the one side wall 320.

The slide supporting portion 33 is formed so as to extend in the first direction X. In the present embodiment, a slit 39 that extends in the first direction X, which is a direction from the leading end of the one side wall 320 to the bottom 31, is formed in the one side wall 320. Also, in this example, the slide supporting portion 33 includes at least one of a pair of edge portions 35 that are located opposite to each other with respect to the slit 39 that is formed in the one side wall 320 so as to extend in the first direction X. In this example, the slide supporting portion 33 includes both of the pair of edge portions 35.

Incidentally, in this example, as shown in FIG. 5, the receiver 34, which will be described later, is provided for a bottom 31-side portion of the slit 39. Therefore, in this example, the slit 39 is provided in the region from the leading end of the one side wall 320 to a position immediately above the bottom 31. In other words, the slide supporting portion 33 is formed so as to extend in the first direction X in the region from the leading end of the one side wall 320 to a position immediately above the bottom 31.

The following describes a relationship between the slidable portions 88 and the slide supporting portion 33. In the protector-equipped wire harness 100, each of the recessed grooves 881 of the slidable portions 88 of the slidable member 82 is recessed so as to allow one of the pair of edge portions 35 of the slide supporting portion 33 to pass therethrough. Therefore, for example, the width of the pair of slidable side walls 882 on both sides of each recessed groove 881 may be equal to the thickness of one of the pair of edge portions 35 (the length in a direction in which the pair of side walls 32 face each other), or larger than the thickness of one of the pair of edge portions 35. Note that, in this example, a portion of the inner surface of one of each pair of slidable side walls 882 is recessed, and the width of each recessed groove 881 is smaller at a leading end-side position with respect to the leading ends of the slidable side walls 882 than at a base-end side position with respect to the base ends of the slidable side walls 882. Therefore, in this example, as shown in FIG. 3, the width of the pair of slidable side walls 882 at a leading end-side position with respect to the leading ends of the slidable side walls 882 is equal to the thickness of one of the pair of edge portions 35, and the width of the pair of slidable side walls 882 at a base end-side position with respect to the base ends of the slidable side walls 882 is larger than the thickness of one of the pair of edge portions 35.

Note that, in another example, the width between the pair of slidable side walls on two sides of each recessed groove may be smaller than the thickness of one of the pair of edge portions. If this is the case, one of the pair of edge portions may be passed through a recessed groove and moved to slide in the first direction X in a state where the recessed groove has deformed to increase the width thereof, and thus the slidable portion may be supported by the slide supporting portion so as to be slidable.

In the present embodiment, the slidable member 82 is moved to slide in the slit 39 in the first direction X toward the bottom 31 in a state where the pair of edge portions 35 of the slide supporting portion 33 are respectively passed through the two recessed grooves 881 of the slidable member 82, and thus the slidable portions 88 are supported by the slide supporting portion 33 so as to be slidable. Therefore, the slit 39 may be a slit that has a certain width in the lengthwise direction of the protector 2 and that allows the slidable member 82 to move in the first direction X. For example, the width of the slit 39 in the lengthwise direction of the protector 2 may be equal to the distance between the bottoms of the two recessed grooves 881 of the slidable member 82, or larger than the distance between the bottoms of the two recessed grooves 881 of the slidable member 82. Note that the aforementioned lengthwise direction of the protector 2 coincides with the lengthwise direction of the electrical wires 9 of the protector-equipped wire harness 100.

Next, the following describes the receiver 34. The receiver 34 is provided on a bottom 31-side portion of the slide supporting portion 33. The receiver 34 is configured to be able to come into contact with at least a portion of the slidable member 82 including the slidable portions 88 that are supported by the slide supporting portion 33 so as to be slidable. In the present embodiment, a surface, which faces toward the bottom 31, of the slidable member 82 that has moved in a direction from the leading end of the one side wall 320 to the bottom 31 comes into contact with the receiver 34, and thus the slidable member 82 is restricted from moving in the first direction X toward the bottom 31. In the protector-equipped wire harness 100, the slidable member 82 of the attachment member 8 comes into contact with the receiver 34, and thus the protector 2 and the attachment member 8 are fixed to each other.

Note that, in another example, the receiver may come into contact with a surface other than the bottommost surface of the slidable member 82. For example, the receiver may come into contact with a protruding portion that protrudes from a lateral side of the slidable member 82, from the bottom side of the protector body, and thus the slidable member 82 may be restricted from moving in the first direction X toward the bottom side.

Next, the following describes the retaining protrusions 36. The retaining protrusions 36 are portions that are locked to the slidable member 82 from a side to prevent the slidable portions 88 from coming loose from the slide supporting portion 33 in a state where the slidable member 82 is in contact with the receiver 34. In this example, the retaining protrusions 36 are formed on the outer surface of the one side wall 320. In this example, as shown in FIGS. 1 and 7, each retaining protrusion 36 includes an inclined portion that is located on the outer surface side of the one side wall 320 and is inclined so that the outward protruding length thereof gradually increases in a direction toward the bottom 31, and a wall portion that is continuous with a bottom 31-side portion of the inclined portion and includes a wall-shaped portion that protrudes outward from the outer surface of the one side wall 320. Note that, in this example, the wall portion protrudes so as to be orthogonal to the outer surface of the one side wall 320.

In this example, if the slidable member 82 is moved in a direction from the leading end of the one side wall 320 to the bottom 31 in a state where the edge portions 35 of the slide supporting portion 33 are passed through the recessed grooves 881 of the slidable portions 88, the recessed grooves 881 will come into contact with the inclined portions of the retaining protrusions 36. Then, if the slidable member 82 is further moved toward the bottom 31, the slidable member 82 elastically deforms along the slopes of the inclined portions to increase the distance between each pair of slidable side walls 882. Note that, in this example, each pair of slidable side walls 882 on both sides (the outer side) of each recessed groove 881 are formed such that base end-side portions of the slidable side walls 882 are thinner than leading end-side portions of the slidable side walls 882, and therefore the pairs of slidable side walls 882 can easily increase in width along the inclined portions of the retaining protrusions 36. Consequently, it is easier to perform an operation to move the slidable member 82 in the first direction X toward the bottom 31. Then, after the recessed grooves 881 have been moved past the inclined portions of the retaining protrusions 36, the recessed grooves 881 reach the wall portions, and consequently the pair of slidable side walls 882 return to their original shape. Thereafter, the slidable member 82 is moved to the receiver 34, and thus the slidable member 82 is restricted from moving in the first direction X toward the bottom 31.

In this example, if the slidable member 82 is moved in the first direction X toward the leading end of the one side wall 320 in a state where a bottom 31-side portion of the slidable member 82 is in contact with the receiver 34, a leading end-side portion of the slidable member 82 with respect to the leading end of the one side wall 320 comes into contact with the wall portions of the retaining protrusions 36. Since the wall portions include wall-shaped portions that are orthogonal to the one side wall 320, the wall portions prevent the recessed grooves 881 of the slidable member 82 from moving toward the leading ends of the one side wall 320 past the retaining protrusions 36. Consequently, it is possible to prevent the slidable portions 88 from moving from a bottom 31-side position to a leading end-side position of the one side wall 320 and coming loose from the slide supporting portion 33.

Note that, in this example, a gap is provided between each retaining protrusion 36 and a leading end-side portion of the slidable member 82 with respect to the leading end of the one side wall 320, in order to prevent them from coming into contact with each other in a state where a bottom 31-side portion of the slidable member 82 is in contact with the receiver 34. However, in another example, each retaining protrusion and a leading end-side portion of the slidable member 82 with respect to the leading end of the one side wall may be in contact with each other in a state where a bottom-side portion of the slidable member 82 is in contact with the receiver.

Also, in another example, the retaining protrusions may be formed on the inner surface of the one side wall. If this is the case, each retaining protrusion may include an inclined portion that is located on the inner surface side of the one side wall and is inclined so that the inward protruding length thereof (protruding toward the electrical wire disposed in the groove) gradually increases in a direction toward the bottom, and a wall portion that is continuous with a bottom-side portion of the inclined portion and includes a wall-shaped portion that protrudes inward from the inner surface of the one side wall.

Next, the following describes the first fixing portions 321. In this example, as shown in FIGS. 1, 3, and 4, the first fixing portions 321 for fixing the lid 4 are provided on both of the pair of side walls 32.

Also, as shown in FIGS. 1 and 3, each side wall 32 is provided with two first fixing portions 321. Note that the first fixing portions 321 on the one side wall 320 are provided on portions on both sides of the portion of the one side wall 320 on which the slide supporting portion 33 is provided.

Also, in this example, the protector body 3 is provided with four first fixing portions 321 in total. Also, in another mode, one side wall may be provided with one first fixing portion, or three or more first fixing portions.

In this example, as shown in FIGS. 1, 3, and 4, each first fixing portion 321 of the protector body 3 includes a pair of first portions 328 that protrude outward from the outer surface of a side wall 32, and a second portion 329 that is a portion between the first portions 328 and is opposite to the outer surface of the side wall 32 with respect to a gap therebetween. Also, lid fixing through holes 322, which are each surrounded by the side wall 32 and the first fixing portions 321 and penetrate in the first direction X, are formed. Second fixing portions 42 of the lid 4 are inserted into the lid fixing through holes 322. The details will be described later.

Also, in the present embodiment, the portion of the one side wall 320, on which the slide supporting portion 33 is provided, protrudes more outward compared to the portions on both sides of the portion of the one side wall 320 on which the slide supporting portion 33 is provided. In this example, in plan view of the protector body 3 as shown in FIGS. 3 and 4, the one side wall 320 includes curved portions (curved portions 325) so that the outward protruding length of the one side wall 320 gradually increases, from the portions of the one side wall 320 on which the first fixing portions 321 are provided to the portion of the one side wall 320 on which the slide supporting portion 33 is provided, in the lengthwise direction of the protector 2. Note that, in this example, the curved portions 325 are provided on both sides of the portion of the one side wall 320 on which the slide supporting portion 33 is provided.

As shown in FIG. 3, for example, the curved portions 325 are portions that are formed so as to curve such that the portion of the one side wall 320 on which the slide supporting portion 33 is provided is displaced outward of the portions of the one side wall 320 on which the first fixing portions 321 are provided, by a distance corresponding to the thickness of a portion of the slidable member 82 provided inward of the one side wall 320. In this case, as shown in FIG. 3, it is possible to prevent a relatively large space from being formed between the inner surface of the one side wall 320 and the electrical wires 9, at the positions of the portions of the one side wall 320 on which the first fixing portions 321 are provided. Also, since the curved portions 325 are formed, it is possible to increase the width of the groove 30 at the position of the portion of the one side wall 320 on which the slide supporting portion 33 is provided, therefore it is possible to provide a space in which the slidable member 82 can be moved in the first direction X.

Note that the curved portions may be portions formed so as to curve such that the portion of the one side wall 320 on which the slide supporting portion 33 is provided is displaced outward of the portion of the one side wall 320 on which the first fixing portions 321 is provided, by the sum of the thickness of the portion of the slidable member 82 provided inward of the one side wall 320 and the thickness of the connector 81.

Next, the following describes the bottom 31 of the protector body 3. The electrical wires 9 are disposed on the bottom 31. In this example, the bottom 31 has a flat shape.

Next, the following describes the lid 4 of the protector 2. In this example, the protector body 3 and the lid 4 are separate members. The protector 2 can be obtained by attaching the lid 4 to the protector body 3. As shown in FIGS. 6 to 8, the lid 4 of the protector 2 includes: a plate-shaped member 41 that is opposite to the bottom 31 of the protector body 3; the second fixing portions 42 for fixing the lid 4 to the protector body 3; a pair of rising portions 43 that protrude from the plate-shaped member 41 to the protector body 3 side; and a contact portion 44 that can come into contact with the slidable member 82 of the attachment member 8. In the present embodiment, the lid 4 further includes a gripping portion 45.

In the present embodiment, the plate-shaped member 41 is a portion that is opposite to the bottom 31, and has a flat shape in this example. In this example, the plate-shaped member 41 has a shape that corresponds to the bottom 31.

Also, as shown in FIG. 1, the pair of rising portions 43 protrude from the side edges of the plate-shaped member 41 toward the bottom 31. The second fixing portions 42 and the contact portion 44, which will be described later, are formed continuously with the pair of rising portions 43.

The second fixing portions 42 are portions that protrude further toward the bottom 31 from the pair of rising portions 43. The second fixing portions 42 are located at positions that correspond to the portions of the pair of side walls 32 on which the first fixing portions 321 are provided.

In this example, as shown in FIG. 1, each second fixing portion 42 includes a lid inclined portion that is inclined so that the outward protruding length thereof gradually increases in a direction from the bottom 31 to the plate-shaped member 41, and a lid wall portion that is a portion that is continuous with a plate-shaped member 41-side portion of the lid inclined portions and protrudes outward from a rising portion 43 in a direction in which the pair of rising portions 43 face each other. Note that, in this example, each lid wall portion protrudes in a direction that is orthogonal to the direction in which the rising portions 43 protrude.

In this example, the second fixing portions 42 are inserted into the lid fixing through holes 322 that are each surrounded by a side wall 32 and a first fixing portion 321 of the protector body 3. Then, the second fixing portions 42 deform along the lid inclined portions, and the lid inclined portions pass through the lid fixing through holes 322. Thereafter, the second fixing portions 42 return to their original shape, the lid wall portions of the second fixing portions 42 come into contact with bottom 31-side portions of the second portions 329 of the first fixing portions 321, and the first fixing portions 321 and the second fixing portions 42 are locked to each other. Thus, the lid 4 is combined with the protector body 3.

Next, the following describes the contact portion 44 and the gripping portion 45. The gripping portion 45 is a portion that sandwiches the pair of edge portions 35 from the inner surface side and the outer surface side of the one side wall 320. The gripping portion 45 includes wall-shaped portions that can sandwich the pair of edge portions 35 from the inner surface side and the outer surface side in a state where the protector body 3 and the lid 4 are fixed to each other. In this example, the gripping portion 45 includes: the contact portion 44 that protrudes further in a direction from a rising portion 43 to the bottom 31 from a portion of the lid 4, the portion corresponding to the pair of edge portions 35 of the protector body 3, and is located on the outer surface side of the pair of edge portions 35; and a protruding portion 46 that protrudes from a portion of the lid 4, the portion corresponding to the pair of edge portions 35 of the protector body 3, in a direction from the plate-shaped member 41 to the bottom 31, and is located on the inner surface side of the pair of edge portions 35. In this example, the contact portion 44 and the protruding portion 46 each have a wall shape that enables the contact portion 44 and the protruding portion 46 to sandwich the pair of edge portions 35 from the inner surface side and the outer surface side.

In the present embodiment, the contact portion 44 and the protruding portion 46 sandwich the pair of edge portions 35 of the one side wall 320 from the inner surface side and the outer surface side to prevent the pair of edge portions 35 from deforming. Here, for example, it is preferable that the distance between the contact portion 44 and the protruding portion 46 is equal to the thickness of each of the pair of edge portions 35. This configuration makes it easier to sandwich the pair of edge portions 35 using the gripping portion 45, while preventing the pair of edge portions 35 from deforming.

Note that, in another example, the distance between the contact portion and the protruding portion may be larger than the thickness of each of the pair of edge portions. If this is the case, it is preferable that the distance between the contact portion and the protruding portion is slightly larger than the thickness of each of the pair of edge portions. Note that, in yet another example, the distance between the contact portion and the protruding portion may be smaller than the thickness of each of the pair of edge portions. If this is the case, the contact portion and the protruding portion may be configured to be deformable such that the distance between the contact portion and the protruding portion increases when they sandwich the pair of edge portions, and it is preferable that the distance is slightly smaller than the thickness of each of the pair of edge portions.

Also, in the present embodiment, as shown in FIGS. 1, 7, and 8, the contact portion 44 is configured to be able to come into contact with a leading end-side portion of the slidable member 82 with respect to the leading end of the one side wall 320. In this example, as shown in FIGS. 7 and 8, the contact portion 44 has a protruding length that enables the contact portion 44 to come into contact with a leading end side portion of the slidable member 82 with respect to the leading end of the one side wall 320 in a state where the protector body 3 and the lid 4 are fixed to each other and a bottom 31-side portion of the slidable member 82 is in contact with the receiver 34. In this case, the slidable member 82 is fixed by being sandwiched between the receiver 34 and the contact portion 44. Therefore, it is possible to more stably fix the slidable member 82 and the protector body 3 to each other.

Next, the following describes an example of a method for obtaining the protector-equipped wire harness 100 that is provided with the protector 2 and the attachment member 8.

First, the pair of edge portions 35 of the protector body 3 are passed through the recessed grooves 881 of the slidable member 82, and thus the slidable portions 88 of the slidable member 82 are supported by the slide supporting portion 33 so as to be slidable in the first direction X.

Thereafter, the slidable member 82 is moved in the first direction X toward the bottom 31. Then, a bottom 31-side portion of the slidable member 82 comes into contact with the receiver 34, and thus the slidable member 82 is restricted from moving in the first direction X toward the bottom 31. Here, in the present embodiment, due to the retaining protrusions 36 being provided, the slidable member 82 in a state of being in contact with the receiver 34 is prevented from moving toward the leading end of the one side wall 320 and coming loose from the slide supporting portion 33.

Then, in a state where the attachment member 8 is fixed to the protector body 3, the lid 4 is placed onto the one side wall 320 from the leading end side of the one side wall 320, the first fixing portions 321 and the second fixing portions 42 are locked to each other, and thus the protector body 3 and the lid 4 are combined into one piece. When the protector body 3 and the lid 4 are combined into one piece, the contact portion 44 of the lid 4 comes into contact with a leading end-side portion of the slidable member 82 with respect to the leading end of the one side wall 320. Thus, the slidable member 82 is sandwiched between the receiver 34 and the contact portion 44, and the slidable member 82 is positioned.

Regarding the present embodiment, through the above-described work, it is possible to obtain the protector-equipped wire harness 100 according to the present embodiment, which is provided with the protector 2 and the attachment member 8. The protector-equipped wire harness 100 can be mounted on a vehicle such as an automobile, for example.

<Effects>

In the present embodiment, regarding the slidable portions 88 of the attachment member 8, the slide supporting portion 33 formed on the one side wall 320 of the protector 2 allows the slidable portions 88 of the attachment member 8 to slide in the first direction X so that the slidable member 82 comes into contact with the receiver 34, and thus the protector 2 and the attachment member 8 are fixed to each other. In this case, there is no need to use a conventional clamp or the like to fix the protector 2 and the attachment member 8 to each other. Therefore, it is possible to prevent a portion of the protector 2 to which the electrical wires 9 are fixed from protruding outward from the outer surface of the protector 2 by a large length.

Also, in the present embodiment, the protector 2 is provided with the retaining protrusions 36. Therefore, it is possible to prevent the slidable portions 88 from moving from a bottom 31-side position to a leading end-side position of the one side wall 320 and coming loose from the slide supporting portion 33. Thus, it is possible to prevent the protector 2 and the attachment member 8 from being released from a state of being fixed to each other.

Also, in the present embodiment, a portion of the one side wall 320, on which the slide supporting portion 33 is provided, protrudes more outward compared to a portion other than the portion of the one side wall 320 on which the slide supporting portion 33 is provided. In this case, it is possible to reduce the width of a portion other than the portion of the protector 2 on which the slide supporting portion 33 is provided, and it is possible to reduce the space required for the protector-equipped wire harness 100.

Also, in the present embodiment, the slide supporting portion 33 includes at least one of a pair of edge portions 35 that are located opposite to each other with respect to the slit 39 that extends in the first direction X, and each slidable portion 88 includes a recessed groove 881 that is recessed so as to allow at least one of the pair of edge portions 35 to pass therethrough. In this case, it is possible to fix the protector 2 and the attachment member 8 to each other using the slide supporting portion 33 and the slidable portions 88, which have a simple configuration including the slit 39 that is formed in the one side wall 320 and the recessed grooves 881 that are recessed so as to allow at least one of the pair of edge portions 35 that are located opposite to each other with respect to the slit 39 to pass therethrough.

Also, in the present embodiment, each slidable portion 88 includes a pair of slidable side walls 882 that define a recessed groove 881. Base end-side portions of the slidable side walls 882 are thinner than leading end-side portions of the slidable side walls 882. In this case, when the slide supporting portion 33 allows the slidable portions 88 to be moved in the first direction X, the recessed grooves 881 are likely to deform such that the width of leading end-side portions thereof increases.

Also, in the present embodiment, the protector 2 includes the lid 4, and the lid 4 includes the gripping portion 45 that sandwiches the pair of edge portions 35 from the inner surface side and the outer surface side of the one side wall 320. That is, the gripping portion 45 grips portions near the pair of edge portions 35, which are portions on both sides of the slit 39 in the one side wall 320, and thus the gripping portion 45 prevents the portions near the pair of edge portions 35 from deforming. Note that, in the present embodiment, the lid 4 is configured to be able to sandwich the portions of the one side wall 320 on which the first fixing portions 321 are provided, from the inner surface side and the outer surface side. In this case, it is possible to prevent the portions of the one side wall 320 on which the first fixing portions 321 are provided from deforming.

Also, in the present embodiment, the lid 4 includes the contact portion 44 that extends toward the bottom 31. In the protector-equipped wire harness 100, the slidable member 82 is fixed by being sandwiched between the receiver 34 and the contact portion 44. In this case, it is possible to more stably fix the protector 2 and the attachment member 8 to each other.

<First Modification>

Figure 9:
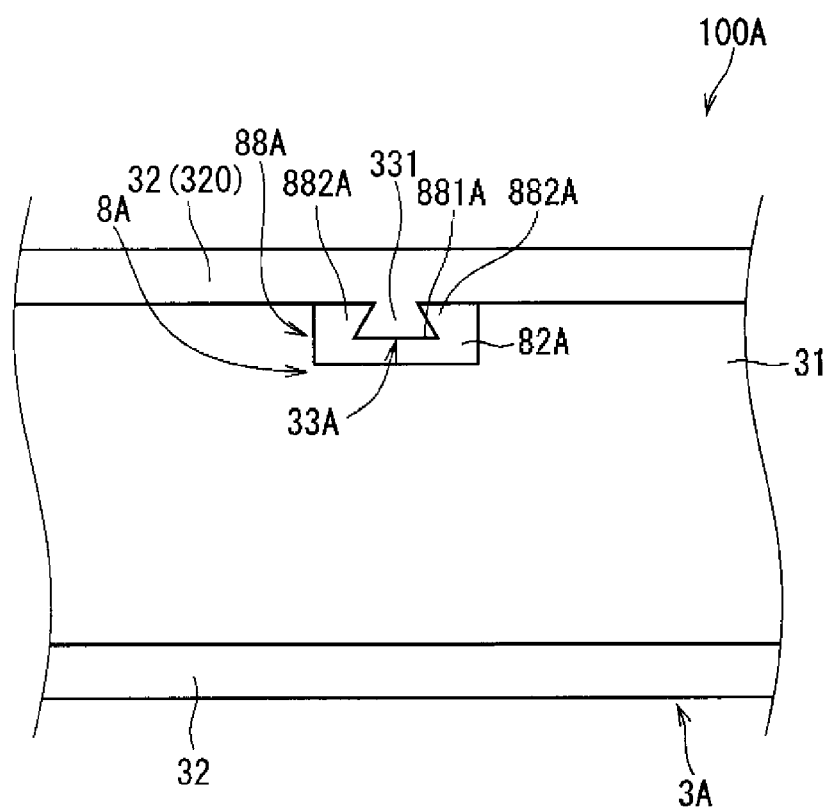
FIG. 9 is a plan view of a portion of a protector of a protector-equipped wire harness according to a first modification and an electrical wire.

Next, a protector-equipped wire harness 100A according to a first modification will be described with reference to FIG. 9. The protector-equipped wire harness 100A includes a slidable portion 88A and a slide supporting portion 33A that have configurations different from those of the slidable portions 88 and the slide supporting portion 33 according to the embodiment. FIG. 9 is a plan view of a portion of the protector 2, and is specifically a plan view of a protector body 3A in which the electrical wires 9 are disposed. Note that the lid 4 is omitted from FIG. 9. Also, in FIG. 9, constituent elements that are the same as those shown in FIGS. 1 to 8 are assigned the same reference numerals. The following describes features of the present modification that are different from those of the embodiment.

Components of the protector 2 other than the slide supporting portion 33A of the protector body 3A, and the lid 4, are the same as those in the embodiment, and therefore descriptions thereof are omitted.

As shown in FIG. 9, in this modification, the one side wall 320 is not provided with the slit 39 according to the embodiment. In this example, the slide supporting portion 33A includes a slide protrusion 331 that is provided on the inner surface side of the one side wall 320 and protrudes from the inner surface of the one side wall 320. The slide protrusion 331 is formed so as to extend in a direction from the leading end of the one side wall 320 to the bottom 31, i.e., in the first direction X.

Also, in the present modification, the slidable portion 88A of a slidable member 82A includes a recessed groove 881A that is recessed so as to allow the slide protrusion 331 to pass therethrough. In this example, the recessed groove 881A is configured to allow sliding in the first direction X in a state of being fitted to the slide protrusion 331. Note that, in an attachment member 8A, components other than the slidable portion 88A are the same as those in the embodiment, and therefore descriptions thereof are omitted.

The following describes the details of the slide protrusion 331 and the recessed groove 881A. In this example, as shown in FIG. 9, the slide protrusion 331 is configured such that the width of a leading end-side portion thereof in the lengthwise direction of the protector 2 is longer than the width of a base end-side portion thereof, which is continuous with the inner surface of the one side wall 320, in the lengthwise direction of the protector 2. In this example, the slide protrusion 331 is configured such that the width thereof in the lengthwise direction of the protector 2 gradually increases in a direction from the base end to the leading end.

Also, in this example, the recessed groove 881A is a recessed groove that has a shape that corresponds to the shape of the contour of the slide protrusion 331 in plan view of the protector body 3A (i.e. when seen in the first direction X). That is, as shown in FIG. 9, the recessed groove 881A is configured such that the distance between a pair of slidable side walls 882A on both sides of the recessed groove 881A gradually increases in a direction from the opening to the bottom of the recessed groove 881A.

In the present modification, the slidable member 82A is brought closer to the protector body 3A from the leading end side of the one side wall 320. Then, the recessed groove 881A of the slidable portion 88A of the slidable member 82A and the slide protrusion 331 of the slide supporting portion 33A of the protector body 3A are aligned in the first direction X. Then, for example, the slidable member 82A in this state is moved in the first direction X toward the bottom 31. Consequently, the slide protrusion 331 and the recessed groove 881A are fitted to each other. Then, the slidable member 82A comes into contact with the receiver 34 that is provided on a bottom 31-side portion of the slide protrusion 331, and thus the attachment member 8A and the protector body 3A are fixed to each other.

With the above-described configuration, also in the present modification, regarding the slidable portion 88A of the attachment member 8A, the slide supporting portion 33A formed on the one side wall 320 of the protector 2 allows the slidable portion 88A of the attachment member 8A to slide in the first direction X so that the slidable member 82A comes into contact with the receiver 34, and thus the protector 2 and the attachment member 8A are fixed to each other. In this case, there is no need to use a conventional clamp or the like to fix the protector 2 and the attachment member 8A to each other. Therefore, it is possible to prevent a portion of the protector 2 to which the electrical wire 9 is fixed from protruding outward from the outer surface of the protector 2 by a large length.

Also, in the present modification, the slide protrusion 331 is configured such that the width thereof in the lengthwise direction of the protector 2 gradually increases in a direction from the base end to the leading end, and the recessed groove 881A has a shape that corresponds to the shape of the contour of the slide protrusion 331 when seen in the first direction X. In this case, once the slide protrusion 331 and the recessed groove 881A are fitted to each other, when an attempt is made to move the slidable member 82A relative to the protector body 3A in a direction in which the pair of side walls 32 face each other, the slide protrusion 331 and the recessed groove 881A are prevented from being released from the state of being fitted to each other. That is, it is possible to more stably fix the attachment member 8A and the protector 2 to each other.

<Second Modification>

Figure 10:
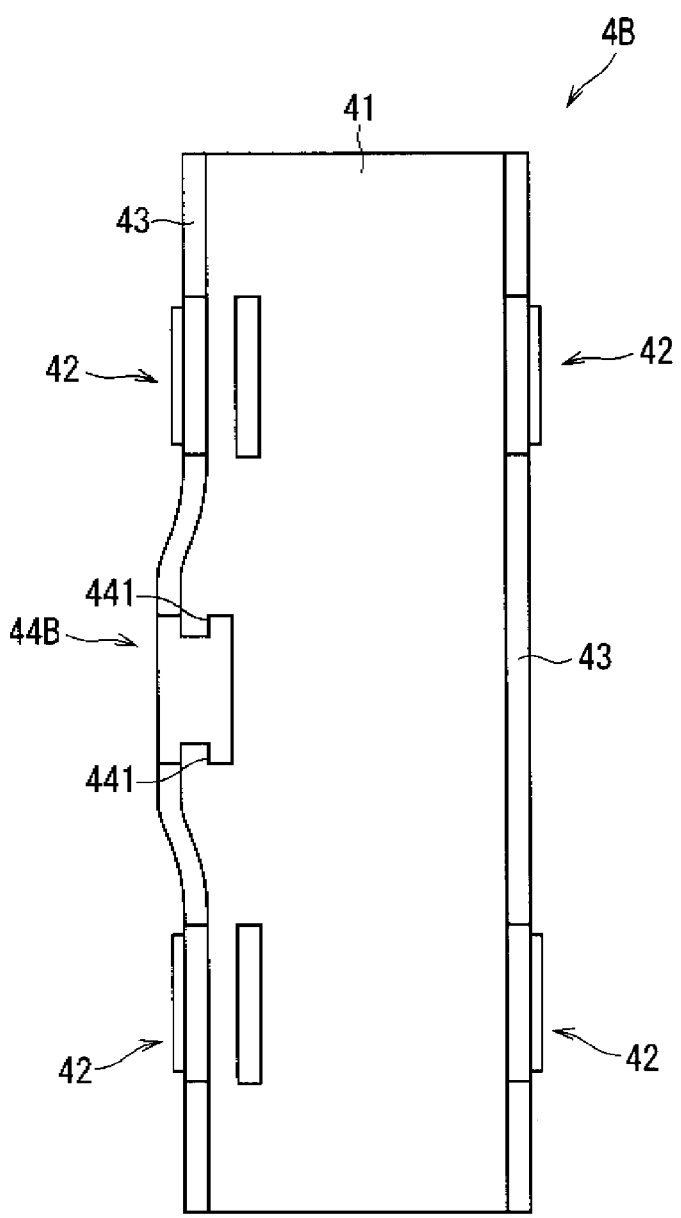
FIG. 10 is a plan view of a portion of a protector of a protector-equipped wire harness according to a third modification.

Next, a lid 4B included in a protector-equipped wire harness according to a second modification will be described with reference to FIG. 10. A protector-equipped wire harness according to the second modification includes a protector body that has the same configuration as in the embodiment, and the lid 4B that has a configuration that is different from the configuration in the embodiment. The following describes the lid 4B.

In the present modification, the lid 4B includes a contact portion 44B that has a configuration that is different from the configuration of the contact portion 44, when compared with the lid 4 in the embodiment. FIG. 10 is a plan view of the lid 4B. Note that FIG. 10 shows the back side of the lid 4B (the bottom side when the lid 4B is attached to the protector body). In FIG. 10, constituent elements that are the same as those shown in FIGS. 1 to 9 are assigned the same reference numerals.

In the present modification, a contact portion 44B of the lid 4B includes a pair of groove-shaped portions 441 that are recessed so as to allow the pair of edge portions 35 to pass therethrough in the first direction X. The pair of groove-shaped portions 441 are provided in the lid 4B at positions that correspond to the slide supporting portion 33 of the protector body 3. More specifically, the pair of groove-shaped portions 441 are located so as to allow the pair of edge portions 35 to pass through the pair of groove-shaped portions 441 in the lid 4B. For example, the contact portion 44B may have the same shape as the contour of the slidable member 82.

Also in the present modification, it is possible to prevent a portion of the protector to which the electrical wires 9 are fixed from protruding outward from the outer surface of the protector by a large length. Also, in the present modification, the contact portion 44B includes the groove-shaped portions 441 that have the same shape as the recessed grooves 881 of the slidable member 82. In this case, it is possible to increase a contact area between the contact portion 44B and the leading end-side portion of the slidable member 82 with respect to the leading end of the one side wall 320, and it is possible to more effectively prevent the slidable member 82 from moving toward the leading end of the one side wall 320.

Second Embodiment

Figure 11:
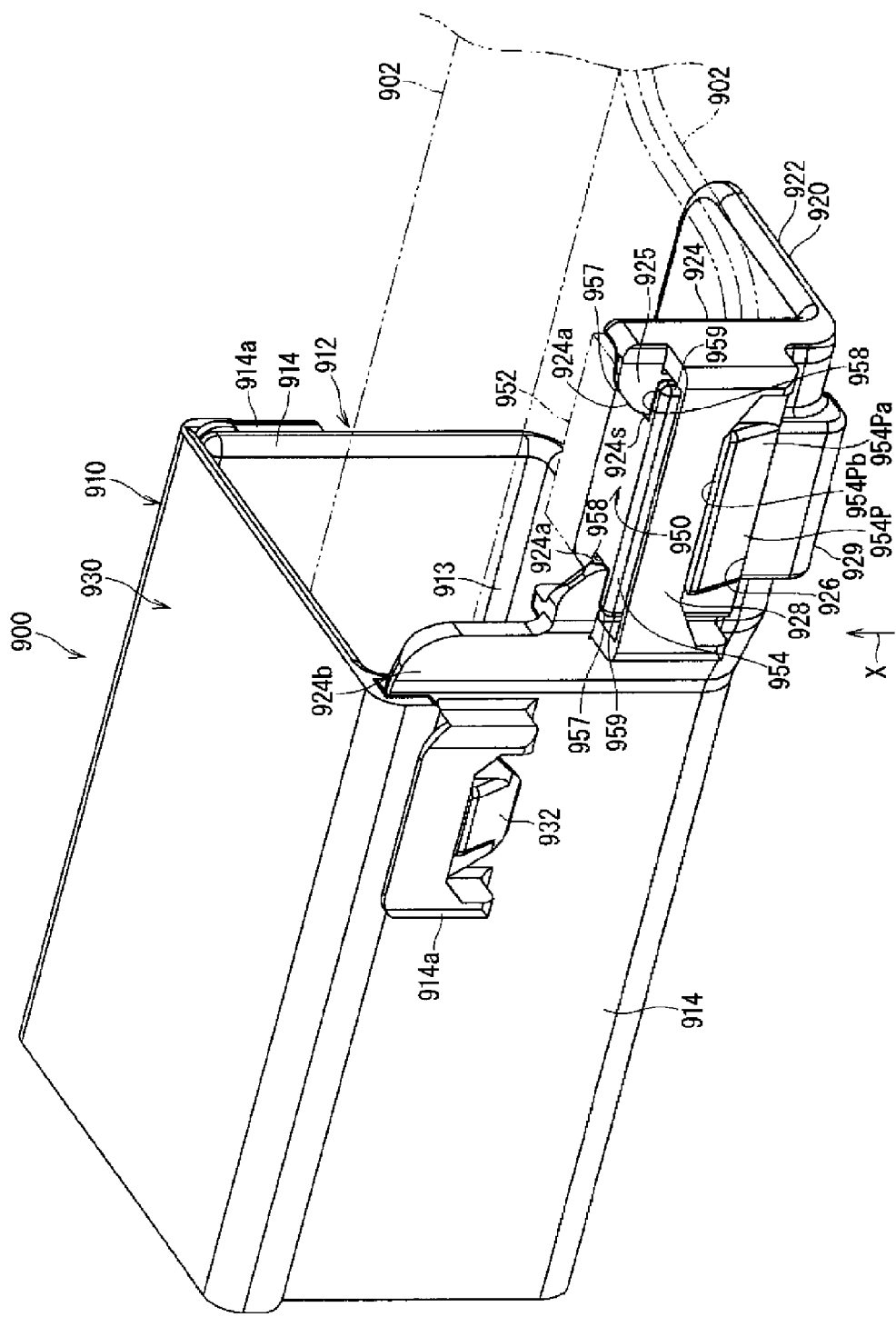
FIG. 11 is a perspective view of a protector-equipped wire harness according to a second embodiment.
Figure 12:
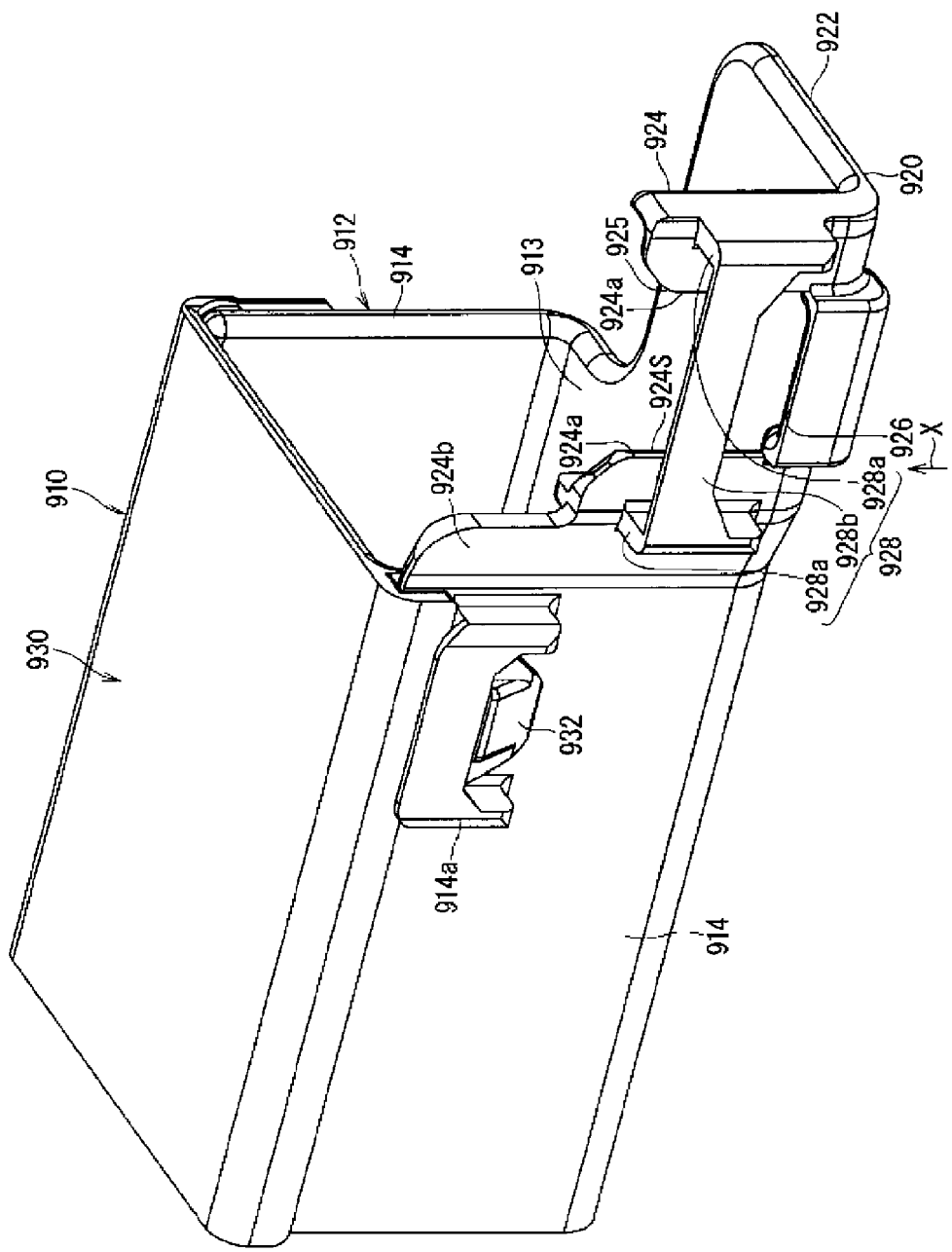
FIG. 12 is a perspective view of a protector according to the second embodiment.
Figure 13:
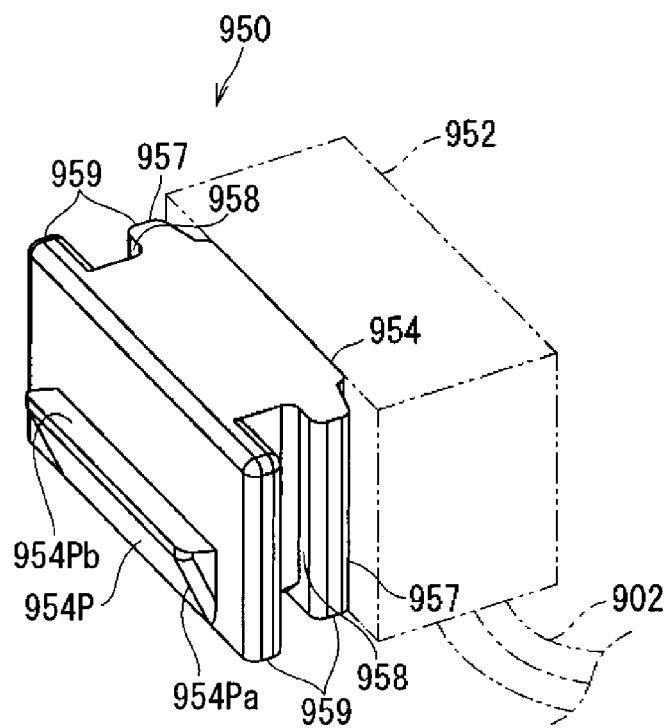
FIG. 13 is a perspective view of an attachment member according to the second embodiment.
Figure 14:
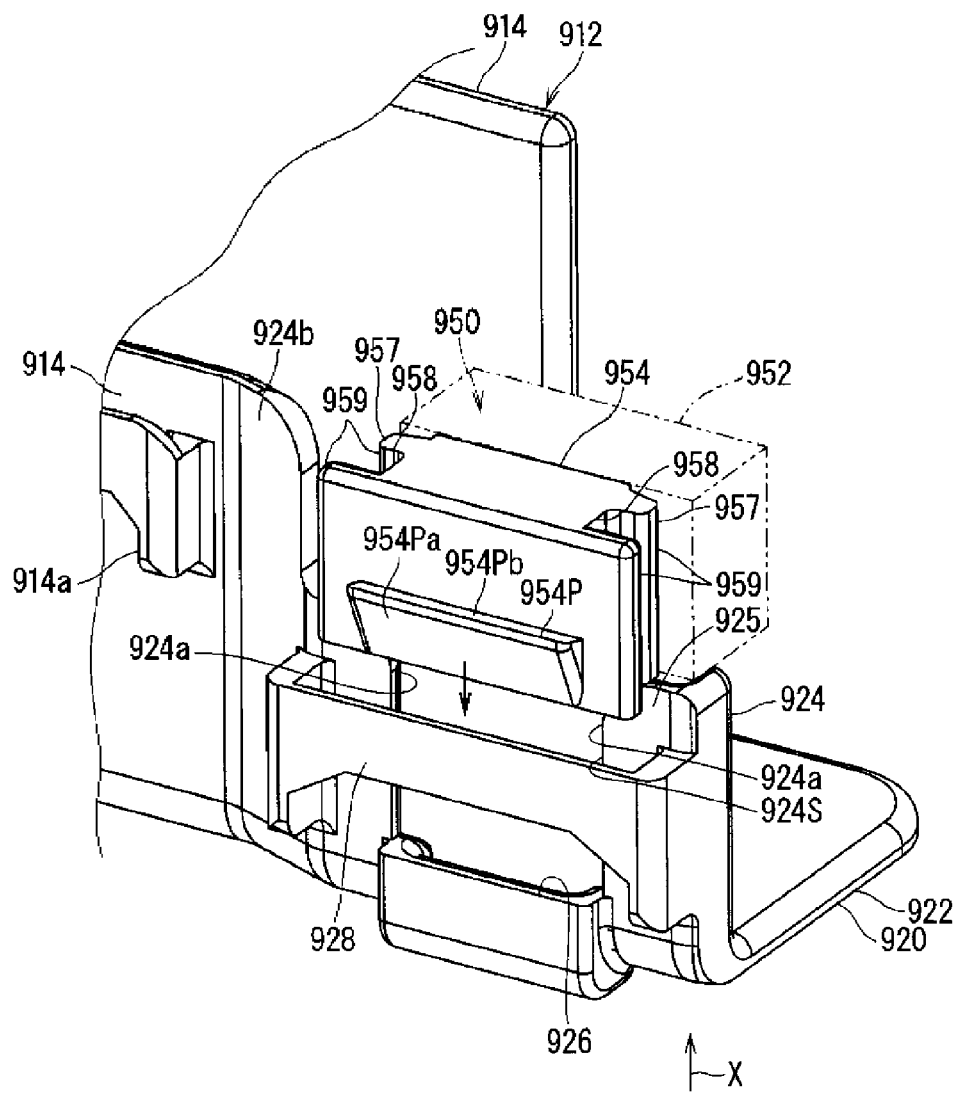
FIG. 14 is a perspective view showing that the attachment member is in the process of being attached to the protector.

The following describes a protector-equipped wire harness 900 according to a second embodiment. FIG. 11 is a perspective view of the protector-equipped wire harness 900, FIG. 12 is a perspective view of a protector 910, FIG. 13 is a perspective view of an attachment member 950, and FIG. 14 is a perspective view showing that the attachment member 950 is in the process of being attached to the protector 910.

The protector-equipped wire harness 900 includes an electrical wire 902, the protector 910, and the attachment member 950.

The electrical wire 902 is a member similar to the electrical wire 9 described in the first embodiment above. Also, in this example, the electrical wire 902 is provided as a plurality of electrical wires 902 that are tied together.

The attachment member 950 includes a slidable member 954, and is provided with a harness-related component, or a component attachment portion for a harness-related component. The following describes an example in which the harness-related component is a connector 952, and the attachment member 950 is provided with the connector 952.

The attachment member 950 is, as with the above-described attachment member 8, a member in which the slidable member 954 and a connector housing portion that constitutes the connector 952 are molded integrally with each other by, for example, pouring resin into a mold.

Also, the slidable member 954 includes slidable portions 957 that are supported by a slide supporting portion 925 of the protector 910, which will be described later, so as to be slidable in the first direction X. In this example, each slidable portion 957 includes a pair of slidable side walls 959 that define a recessed groove 958 that has a recessed shape. In the protector-equipped wire harness 900, the recessed grooves 958 penetrate through the slidable member 954 in the first direction X.

In the present embodiment, one of the pair of slidable side walls 959 on both sides of a recessed groove 958 has a plate-like shape that has a constant thickness, and the other is formed such that a base end-side portion thereof is thicker than a leading end-side portion thereof. As a matter of course, as in the above-described first embodiment, at least one of the pair of slidable side walls on both sides of a recessed groove may be formed such that a base end-side portion thereof is thinner than a leading end-side portion thereof.

The recessed grooves 958 are each provided on either one side of the through hole 955. Therefore, in this example, the slidable portions 957 include two pairs of slidable side walls 959, each pair being provided on either one side of the through hole 955. The respective openings of the two recessed grooves 958 provided on both sides of the through hole 955 face opposite directions. This is because a pair of edge portions 924a, which will be described later, are to be passed through the two recessed grooves 958 of the slidable portion 957.

Also, the slidable member 954 is provided with a lock protrusion 954P that is locked to a coupling portion 928, which will be described later, from a side to prevent the slidable portions 957 from coming loose from the slide supporting portion 925 in a state where the slidable member 954 is in contact with a receiver 926, which will be described later.

More specifically, the lock protrusion 954P is provided on a surface of the slidable member 954, the surface being opposite to the surface on the side of which the connector 952 is disposed. The lock protrusion 954P is formed such that the height thereof gradually decreases in a direction in which the slidable portions 957 is inserted (the first direction X). When the slidable portions 957 of the slidable member 954 are moved to slide in the first direction X relative to the slide supporting portion 925, a guide inclined surface 954Pa of the lock protrusion 954P comes into contact with the coupling portion 928, which will be described later, so as to elastically deform the coupling portion 928 outward. When the slidable portions 957 of the slidable member 954 is moved to slide in the first direction X relative to the slide supporting portion 925 and the lock protrusion 954P moves past the coupling portion 928, the slidable member 954 comes into contact with the receiver 926, and an abutting surface 954Pb of the lock protrusion 954P, the abutting surface 954Pb being opposite to a surface that is located in the first direction X, and being orthogonal to the first direction X, abuts against the coupling portion 928.

The protector 910 is a member that covers at least a portion of the outer circumferential surface of the electrical wires 902 to protect the electrical wires 902. The protector 910 is a member that is made of resin, for example. In this example, the protector 910 has a shape that can protect a straight section of the electrical wires 902. However, the protector 910 may have a shape that can protect a curved section of the electrical wires 902, or a shape that can protect both the curved section and the straight section of the electrical wires 902, for example.

In the present embodiment, the protector 910 includes a protector body 912 and an extension fixing portion 920.

The protector body 912 includes a bottom 913 and a pair of side walls 914 that protrude from the bottom 913.

The extension fixing portion 920 is formed so as to extend outward from one end portion of the protector body 912, and includes a bottom extension portion 922 and a side wall extension portion 924 that protrudes from one side portion of the bottom extension portion 922. The bottom extension portion 922 is a portion that extends from one end portion of the above-described bottom 913, and the side wall extension portion 924 is a portion that extends from one end portion of one of the pair of side walls 914. Therefore, when the protector 910 is taken as a whole, the bottom extension portion 922 can be seen as a portion of the bottom of the protector 910, and the side wall extension portion 924 can be seen as a portion of one of the pair of side walls of the protector 910. Note that a portion of the side wall extension portion 924, on which the slide supporting portion 925 is provided, protrudes further outward than one of the side walls 914, with an inclined side wall 924b being interposed therebetween.

The protector 910 also includes a lid 930. Second fixing portions 932, which have the same configurations as the above-described second fixing portions 42, are provided on both sides of the lid 930 so as to protrude, and first fixing portions 914a, which have the same configuration as the above-described first fixing portions 321, are provided on the outer surfaces of the pair of side walls 914. The second fixing portions 932 are inserted into and fixed to the first fixing portions 914a when the lid 930 is in a closed state, and thus the lid 930 is kept in the closed state. The lid 930 may be omitted.

It is not essential that the protector 910 has the above-described shape. For example, the protector 910 may have a flat plate shape overall, or a shape in which a side wall stands upright on only one side portion of the bottom. If the protector includes a plate-shaped portion, the slide supporting portion may be formed on the plate-shaped portion.

The above-described side wall extension portion 924 is a plate-shaped portion, and the slide supporting portion 925 is formed so as to extend inward (toward the bottom extension portion 922) in the first direction X from one edge portion of the side wall extension portion 924 (the edge portion that is opposite to the edge portion that is continuous with the bottom extension portion 922). Also, the receiver 926 is formed on the far side in the first direction X (the bottom extension portion 922 side) relative to the slide supporting portion 925. In the present embodiment, the protector 910 further includes the coupling portion 928. The slide supporting portion may be provided on either one or both of the pair of side walls 914 of the protector body 912.

More specifically, the side wall extension portion 924 is provided with a slit 924S that extends in the first direction X from an edge portion of the side wall extension portion 924. The slit 924S is provided in the range from an edge portion of the side wall extension portion 924 to a position immediately above the bottom extension portion 922. The slide supporting portion 925 includes at least one of the pair of edge portions 924a that are located opposite to each other with respect to the slit 924S formed in the side wall extension portion 924. In this example, the slide supporting portion 925 includes both of the pair of edge portions 924a.

The following describes a relationship between the slidable portions 957 and the slide supporting portion 925. Each of the recessed grooves 958 of the slidable portions 957 of the slidable member 954 is recessed so as to allow one of the pair of edge portions 924a of the slide supporting portion 925 to pass therethrough. For example, the distance between the pair of slidable side walls 959 on both sides of each recessed groove 958 may be set to a value that is equal to, or larger (slightly larger) than the thickness of the edge portions 924a. Note that grooves that extend in the first direction X may be formed on both sides of the slit, and both edge portions of the slidable member may be inserted into the grooves so as to be slidable. Such a configuration is also applicable to the first embodiment.

In the present embodiment, the slidable member 954 is moved to slide along the slit 924S in the first direction X toward the bottom extension portion 922 in a state where the pair of edge portions 924a of the slide supporting portion 925 are respectively passed through the two recessed grooves 958 of the slidable member 954, and thus the slidable portions 957 are supported by the slide supporting portion 925 so as to be slidable.

The receiver 926 is provided on the bottom extension portion 922 side relative to the slide supporting portion 925. The receiver 926 is configured to be able to come into contact with the slidable member 954 including the slidable portions 957 that are supported by the slide supporting portion 925 so as to be slidable. In the protector-equipped wire harness 900, the protector 910 and the attachment member 950 are fixed to each other in a state where the slidable member 954 of the attachment member 950 is in contact with the receiver 926.

Also, in this example, the receiver 926 is provided for a bottom side portion of the slit 924S.

In this example, a frame is formed on a bottom side portion of the slit 924S, the frame including portions extending outward from the two end portions of the slit 924S and a portion coupling the outer ends of the extending portions to each other. A through hole is formed in this frame. A portion of the frame, the portion being located on the opposite side in the direction in which the slidable portions 957 are moved to slide so as to be inserted, constitutes the receiver 926. Therefore, in this example, a surface of the slidable member 954 that is moved in a direction from an edge portion of the side wall extension portion 924 toward the bottom extension portion 922, the surface facing the bottom extension portion 922, comes into contact with the receiver 926, and thus the slidable member 954 is restricted from moving toward the bottom extension portion 922 in the first direction X.

Also, the coupling portion 928 is provided so as to couple the pair of edge portions 924a, which are located opposite to each other with respect to the above-described slit 924S, to each other. The coupling portion 928 couples the pair of edge portions 924a to each other at a position that is away from the trajectories of the slidable portions 957 sliding on the slide supporting portion 925, specifically at a position that is away from the trajectory of the slidable member 954 that includes the slidable portions 957 in this example. More specifically, the coupling portion 928 includes a pair of side protrusions 928a that protrude from the pair of edge portions 924a to the outside of the side wall extension portion 924, and an intermediate coupling portion 928b that couples the pair of side protrusions 928a at a position that is at a distance from the outer surface of the side wall extension portion 924. The recessed grooves 958 of the slidable portions 957 on both sides of the slidable member 954 move along the edge portions 924a, inside the pair of side protrusions 928a, and the entire slidable member 954 moves in the first direction X, inside the intermediate coupling portion 928b.

The coupling portion 928 is located closer to the opening of the slit 924S than to the bottom of the slit 924S, and prevents the slit 924S from opening.

In a state where the slidable member 954 is in contact with the receiver 926, the coupling portion 928 is located at a position that is outside the slidable member 954 and is on the opposite side relative to the lock protrusion 954P in the direction in which the slidable member 954 is inserted. In a state where the slidable member 954 is in contact with the receiver 926, the abutting surface 954Pb of the lock protrusion 954P of the slidable member 954 is locked to and retains the coupling portion 928.

Note that the same retaining protrusions 36 as in the above-described first embodiment may be provided in the present embodiment.

The above-described protector-equipped wire harness 900 can be obtained through procedures that are the same as those described in the first embodiment above.

That is, the slidable member 954 is moved to slide in the first direction X toward the bottom extension portion 922 so that the slidable member 954 comes into contact with the receiver 926. While being moved, the guide inclined surface 954Pa of the lock protrusion 954P comes into contact with the coupling portion 928, and elastically deforms the coupling portion 928 outward. Upon the lock protrusion 954P being moved past the coupling portion 928, the coupling portion 928 elastically returns to its original shape, and the lock protrusion 954P is locked to and retains the coupling portion 928. In this state, in the first direction X, the slidable member 954 on the bottom extension portion 922 side comes into contact with the receiver 926 and is restricted from moving in this direction, and the lock protrusion 954P on the opposite side comes into contact with the coupling portion 928 and is restricted from moving in this direction. Thus, the slidable member 954 is fixed to the slide supporting portion 925.

Before or after the above-described work is performed, the electrical wires 902 are housed in the protector body 912, the lid 930 is closed, and the first fixing portions 914a and the second fixing portions 932 are fixed to each other.

<Effects>

According to the present embodiment, slidable portions 957 of the attachment member 950 are moved relative to the slide supporting portion 925 to slide in the first direction so that the slidable member 954 comes into contact with the receiver 926, and the protector 910 and the attachment member 950 are fixed to each other in such a state. In this case, there is no need to use a conventional clamp. Therefore, it is possible to prevent a portion of the protector to which the electrical wire is fixed from protruding outward from the outer surface of the protector by a large length.

Also, in the present embodiment, a portion of the side wall extension portion 924, on which the slide supporting portion 925 is provided, protrudes further outward than one of the side walls 914, with an inclined side wall 924b being interposed therebetween. In this case, it is possible to reduce the width of the portions other than the portion of the protector 910 on which the slide supporting portion 925 is provided, and it is possible to reduce the space required for the protector-equipped wire harness 900.

Also, in the present embodiment, the slide supporting portion 925 includes at least one of the pair of edge portions 924a that are located opposite to each other with respect to the slit 924S that extends in the first direction X, and the slidable portions 957 include the recessed grooves 958 that are recessed so as to allow at least one of the pair of edge portions 924a to pass therethrough. With this configuration, it is possible to fix the protector 910 and the attachment member 950 to each other using the slide supporting portion 925 and the slidable portions 957, which have a simple configuration.

Also, in the present embodiment, the pair of edge portions 924a on both sides of the slit 924S are coupled to each other by the coupling portion 928. Therefore, the pair of edge portions 924a are less likely to move away from each other, and the edge portions 924a are less likely to be released from the configuration in which the edge portions 924a are fitted to the recessed grooves 958. Thus, it is possible to more firmly fix the attachment member 950 to the protector 910.

In addition, the lock protrusion 954P is locked to and retains the coupling portion 928 in a state where the slidable member 954 is in contact with the receiver 926. Therefore, it is possible to more reliably prevent the attachment member 950 from coming loose from the protector 910 in the first direction X. In particular, due to the configuration in which the slit 924S is prevented by the coupling portion 928 from opening out, and the lock protrusion 954P is locked to and retains the coupling portion 928, it is possible to more firmly fix the attachment member and the protector, and it is possible to employ, for example, a configuration in which the attachment member is pressed and held by the lid of the protector. Therefore, the present embodiment is suitable for a protector that does not have a lid.

{Modification}

Figure 15:
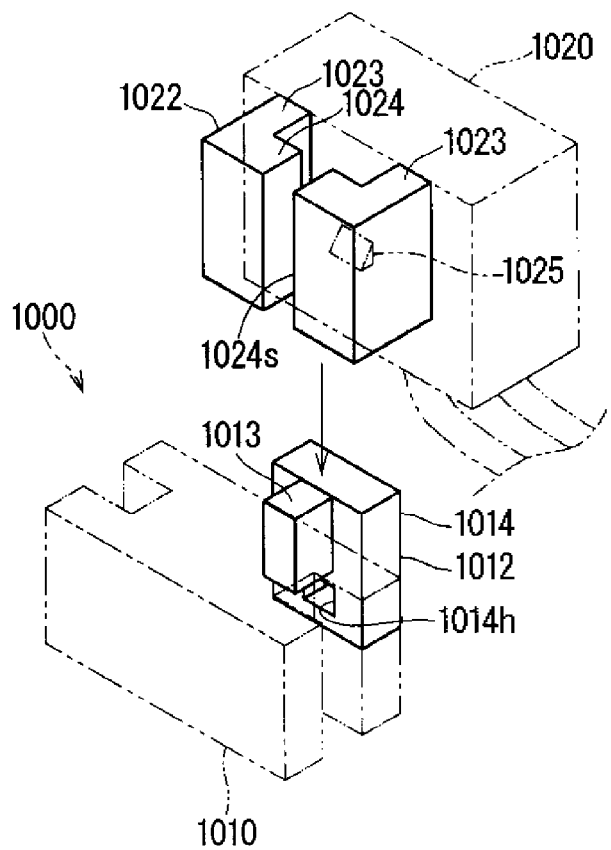
FIG. 15 is a schematic perspective view of an attachment member according to a modification.

FIG. 15 is a diagram showing an attachment member 1000 in which a slidable member 1010 is provided with a component attachment portion 1012 for a connector 1020, where the harness-related component is the connector 1020.

The attachment member 1000 includes the slidable member 1010 and the component attachment portion 1012. A slidable attachment portion structure that can be moved to slide so as to be attached to the connector 1020 can be used as the component attachment portion 1012.

In this example, a slide receiver 1022 is formed in the connector 1020. The slide receiver 1022 includes a pair of side portions 1023, and ceiling portions 1024 that extends from the upper edges of the pair of side portions 1023 in a direction in which they approach each other. The ceiling portions 1024 are provided with a slit 1024S between the pair of side portions 1023, which extends in a direction in which the pair of side portions 1023 extend. The width of the slit 1024S is smaller than the width of the pair of side portions 1023. A portion below the slit 1024S of the connector 1020 is provided with a lock protrusion 1025. The lock protrusion 1025 is formed so as to have a protruding shape and the height thereof gradually increases in one direction in which the slit 1024S extends.

The component attachment portion 1012 is configured to be able to be attached to the connector 1020 upon being moved to slide and being inserted into the above-described slide receiver 1022.

That is, the component attachment portion 1012 is formed integrally with one main surface of the slidable member 1010. The component attachment portion 1012 is configured such that an insertion plate 1014 is formed at a leading end of a base portion 1013. The width of the base portion 1013 is smaller than the width of the slit 1024S so that the base portion 1013 can be moved to slide so as to be inserted into the slit 1024S. The width of the insertion plate 1014 is larger than the width of the slit 1024S and is smaller than the interval between the pair of side portions 1023. A lock hole 1014*h* to which the above-described lock protrusion 1025 can be locked is formed in the insertion plate 1014.

The base portion 1013 is inserted into the slit 1024S and the insertion plate 1014 is inserted into the gap between the pair of side portions 1023, and thus the component attachment portion 1012 is inserted into the slide receiver 1022, and the lock protrusion 1025 is locked to the lock hole 1014*h*. As a result, the component attachment portion 1012 is insertion-fixed by the slide receiver 1022. Thus, the attachment member 1000 is attached to the connector 1020.

An insertion-fixing structure, called a cassette structure for a connector or the like, can be employed as the component attachment portion 1012 and the slide receiver 1022.

Note that the task of attaching the connector 1020 to the attachment member 1000 may be performed before or after the attachment member 1000 is attached to the protector.

The following describes examples of usage of the protector-equipped wire harness, assuming that the harness-related component is a connector as in the above-described embodiments and modifications. Here, the protector-equipped wire harness 900 according to the second embodiment is taken as an example.

Figure 16:
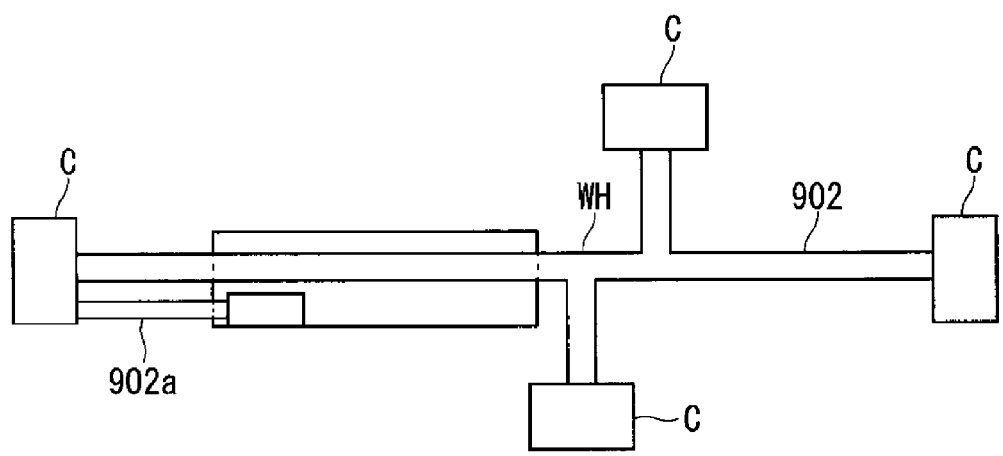
FIG. 16 is a diagram illustrating a usage example of a protector-equipped wire harness.

That is, as shown in FIG. 16, a wire harness WH in which a plurality of electrical wires 902 are tied together in a branched state according how they are routed in a vehicle. A portion of the wire harness WH in the extension direction thereof is housed in the protector 910.

The plurality of electrical wires 902 are connected to connectors C that are provided at any of the ends of the wire harness WH. The connector 952 for the attachment member 950 is connected to the end of an electrical wire 902*a* that extends from one of the plurality of connectors C. The electrical wire 902*a* connected to the connector 952 is additional wiring that may be necessary or unnecessary depending on the grade of the vehicle on which the protector-equipped wire harness 900 is mounted, the presence or absence of an option, and so on. The attachment member 950 is attached to the protector 910.

A protector-equipped wire harness 900 in which a partner connector is not connected to the connector 952 of the above-described attachment member 950 is manufactured in advance as a common harness that is independent of whether or not additional wiring is required (see FIG. 16).

When this protector-equipped wire harness 900 is mounted on a vehicle that does not require additional wiring, wiring (electrical wires) from the connector 952 can be omitted. Therefore, it is possible to reduce costs and weight, for example.

Figure 17:
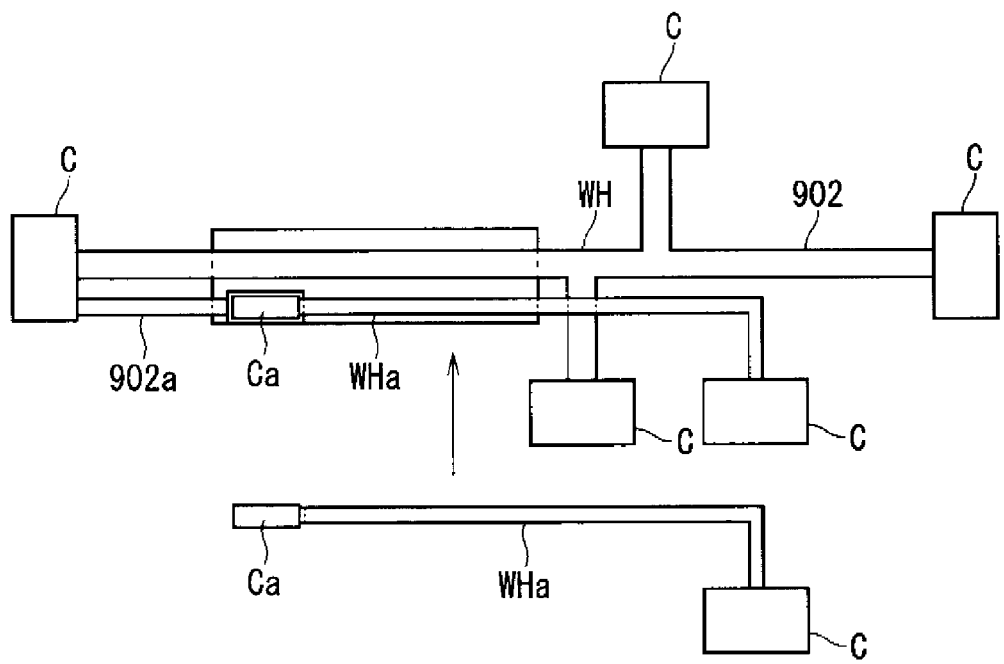
FIG. 17 is a diagram illustrating a usage example of a protector-equipped wire harness.

On the other hand, when the protector-equipped wire harness 900 is mounted on a vehicle that requires additional wiring, an additional harness WHa for wiring from the connector 952 to a partner electric component is added as shown in FIG. 17. The addition of the additional harness WHa can be easily realized by connecting a partner connector Ca to the connector 952. Therefore, it can be easily adapted to a vehicle that requires additional wiring.

By combining the above-described configurations, it is also possible to reduce the number of types of the protector-equipped wire harness.

The above embodiments and modifications describe examples in which the harness-related component is a connector. However, the harness-related component may be any type of component that is to be disposed near the harness, such as a component for fixing the protector, a component for fixing electrical wires, or the like.

Figure 18:
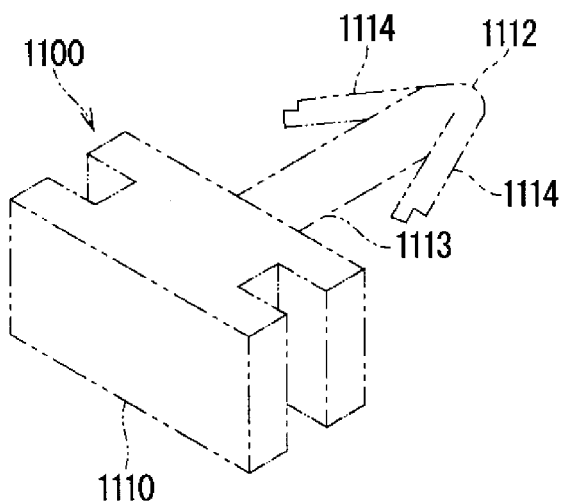
FIG. 18 is a schematic perspective view of an attachment member according to a modification.
Figure 19:
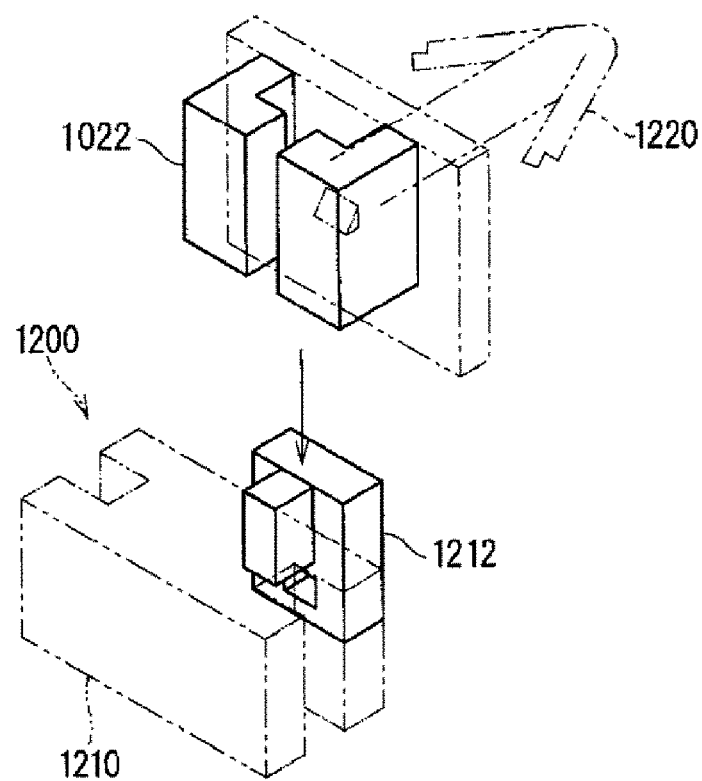
FIG. 19 is a schematic perspective view of an attachment member according to a modification.

The example shown in FIGS. 18 and 19 is an example in which the harness-related component is a vehicle fixing portion that is fixable to a vehicle body. In this modification, the vehicle fixing portion may be attached so as to protrude outward from the protector.

In the example shown in FIG. 18, an attachment member 1100 is an integrally molded component of resin or the like, and a vehicle fixing portion 1112 is formed integrally with the slidable member 1110.

The vehicle fixing portion 1112 is configured such that a pair of lock pieces 1114 extend therefrom so as to gradually spread in a direction from a leading end portion to a based end portion of a pillar 1113. Upon the vehicle fixing portion 1112 being inserted into a fixing hole that is formed in the vehicle, the pair of lock pieces 1114 are locked to and retains the edge of the fixing hole, and the vehicle fixing portion 1112 is fixed to the vehicle. A structure for fixing a vehicle, called a clamp or a clip, can be employed as the vehicle fixing portion.

In the example shown in FIG. 19, an attachment member 1200 includes a component attachment portion 1212 formed integrally with a slidable member 1210 integrally molded using resin or the like, and a vehicle fixing portion 1220 is attached to the component attachment portion 1212.

Regarding structures for attaching them, the component attachment portion 1212 employs the same configuration as the above-described component attachment portion 1012, and a base end portion of the vehicle fixing portion 1220 employs the same configuration as the above-described slide receiving portion.

Figure 20:
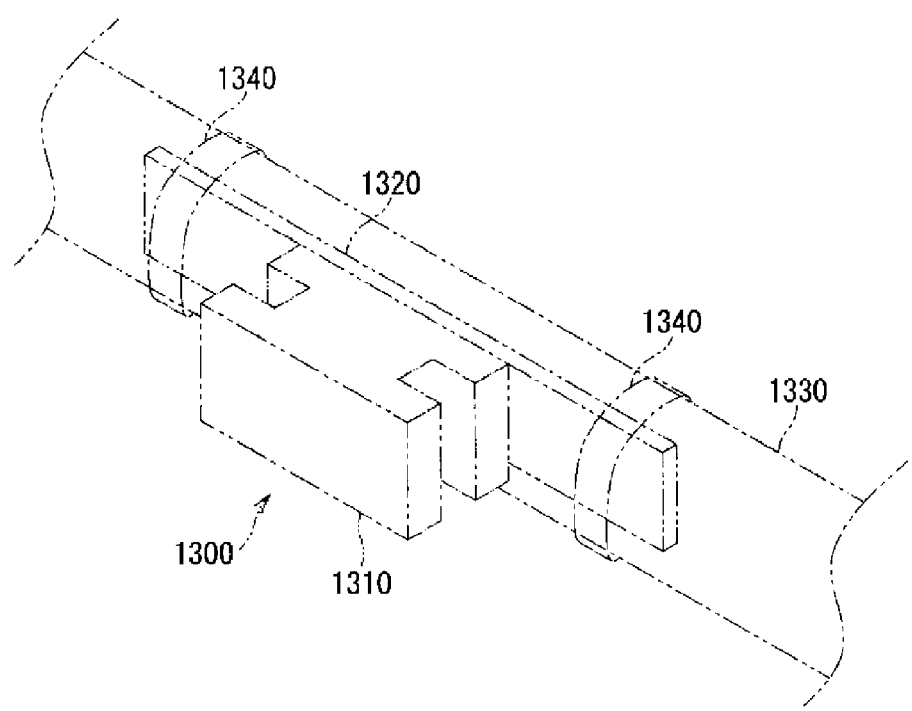
FIG. 20 is a schematic perspective view of an attachment member according to a modification.

The example shown in FIG. 20 is an example in which the harness-related component is an electrical wire.

In this example, an attachment member 1300 is an integrally molded component of resin or the like, and an elongated electrical wire attachment portion 1320, which serves as a component attachment portion, is formed integrally with a slidable member 1310.

The elongated electrical wire attachment portion 1320 is formed so as to have a long and thin plate shape, and protrudes from both sides of the slidable member 1310. In a state where the elongated electrical wire attachment portion 1320 is disposed along the electrical wire 1330, both end portions of the elongated electrical wire attachment portion 1320 and the electrical wire 1330 are bound using a binding member 1340 such as a piece of adhesive tape, and thus the elongated electrical wire attachment portion 1320 is attached to the electrical wire 1330.

As described in the embodiments and the modifications, the slidable member may be provided with a harness-related component or an attachment portion for attaching a harness-related component.

When the slidable member is provided with a harness-related component, the slidable member and the harness-related member may be integrally molded using resin or the like.

When the slidable member is provided with an attachment portion for attaching a harness-related component, a slidable attachment portion that is slidable relative to, and attachable to, the harness-related component may be provided as a component attachment portion.

Also, as described above, the harness-related component may be any type of component that is to be disposed near the harness, such as a connector, a vehicle fixing portion, or an electrical wire.

Note that, in the embodiments and the modifications, a connector, a vehicle fixing portion, and an electrical wire, which are harness-related components, may be disposed outside or inside the protector. When a harness-related component is disposed outside the protector, such a structure is an advantage in that the length of a portion that protrudes inward of the protector is reduced.

Also, in each embodiment, the lid may be coupled to the protector body so as to be able to open and close, using a hinge.

Also, in each embodiment, the slide supporting portion may include only one of the pair of edge portions that are located opposite to each other with respect to the slit.

In the first modification, the configuration of the slidable portion and the configuration of the slide supporting portion may be interchanged. For example, the slidable portion may have a protruding portion, and the slide supporting portion may have a recessed groove that allows the protruding slidable portion to pass therethrough.

Also, in the second embodiment, the contact portion and the gripping portion described in the first embodiment may be provided.

Note that the configurations described in the embodiments and modifications above may be combined with each other as appropriate, unless they contradict each other.

Although the present invention has been described above in detail, the descriptions above are examples in all aspects, and the present invention is not limited to the descriptions. It is understood that innumerable modifications that are not illustrated can be envisaged without departing from the scope of the present invention.

LIST OF REFERENCE NUMERALS 2, 2B, 910: Protector
3, 3A, 3B, 912: Protector Body
4, 4B, 4C: Lid
8, 8A, 950: Attachment Member
9, 902, 1330: Electrical Wire
30: Groove
31, 913: Bottom
32, 914: Side Wall
33, 33A, 925: Slide Supporting Portion
34, 34B, 926: Receiver
35, 924a: Edge Portion
36: Retaining Protrusion
39, 924S: Slit
44, 44C: Contact Portion
45, 46: Protrusion
88, 88A, 957: Slidable Portion
100, 100A, 100B, 900: Protector-equipped Wire Harness
320: One Side Wall
441: Groove-shaped Portion
81, 952, 1020: Connector
82, 82A, 954, 1010, 1110, 1210, 1310: Slidable Member
881, 881A, 958: Recessed Groove
882, 882A, 959: Slidable Side Wall
920: Extension Fixing Portion
922: Bottom Extension Portion
924: Side Wall Extension Portion
924b: Inclined Side Wall
928: Coupling Portion
954P: Lock Protrusion
X: First Direction
1000, 1100, 1200, 1300: Attachment Member
1012, 1212: Component Attachment Portion
1022: Slide Receiver
1112, 1220: Vehicle Fixing Portion
1320: Elongated Electrical Wire Attachment Portion
1340: Binding Member

The invention claimed is:

1. A protector-equipped wire harness comprising:
an electrical wire;
a protector that includes a plate-shaped portion, a slide supporting portion formed so as to extend inward in a first direction from one edge portion of the plate-shaped portion, and a receiver that is provided on a far side with respect to the slide supporting portion, the protector being disposed so as to cover at least a portion of an outer circumferential surface of the electrical wire; and
an attachment member that includes a slidable member that includes a slidable portion having a recessed groove and supported by the slide supporting portion so as to be slidable in the first direction, the attachment member being provided with a harness-related component or a component attachment portion for a harness-related component,
wherein the protector and the attachment member are fixed to each other in a state where the slidable member of the attachment member is in contact with the receiver,
the harness-related component is a connector,
the attachment member is provided with the connector or a component attachment portion that is attachable to the connector,
the connector is provided on a portion of the slidable member, the portion facing toward the inside of the protector,
the slide supporting portion includes at least one of a pair of edge portions that are located, opposite to each other with respect to a slit that extends in the first direction,
the slidable portion is supported so as to be slidable in the first direction relative to at least one of the pair of edge portions, and
the protector-equipped wire harness further includes a coupling portion that couples the pair of edge portions, which are located opposite to each other with respect to the slit, to each other at a position that is away from a trajectory of the slidable portion sliding on the slide supporting portion.

2. The protector-equipped wire harness according to claim 1,
wherein the protector includes a retaining protrusion that is locked to the slidable member from a side to prevent the slidable portion from coming loose from the slide supporting portion in a state where the slidable member is in contact with the receiver.

3. The protector-equipped wire harness according to claim 1,
wherein the slidable member is provided with a lock protrusion that is locked to the coupling portion from a side to prevent the slidable portion from coming loose from the slide supporting portion in a state where the slidable member is in contact with the receiver.

4. The protector-equipped wire harness according to claim 1,
wherein the slide supporting portion includes at least one of a pair of edge portions that are located opposite to each other with respect to a slit that extends in the first direction, and
the recessed groove of the slidable portion is configured to allow one of the pair of edge portions to pass therethrough, and includes at least one of a pair of slidable side walls that are provided on both sides of the recessed groove.

5. The protector-equipped wire harness according to claim 1,
wherein a portion of the plate-shaped portion, on which the slide supporting portion is provided, protrudes more outward compared to portions on both sides of the portion on which the slide supporting portion is provided.

6. A protector-equipped wire harness comprising:
an electrical wire;
a protector that includes a plate-shaped portion, a slide supporting portion formed so as to extend inward in a first direction from one edge portion of the plate-shaped portion, and a receiver that is provided on a far side with respect to the slide supporting portion, the protector being disposed so as to cover at least a portion of an outer circumferential surface of the electrical wire; and
an attachment member that includes a slidable member that includes a slidable portion supported by the slide supporting portion so as to be slidable in the first direction, the attachment member being provided with a harness-related component or a component attachment portion for a harness-related component,
wherein the protector and the attachment member are fixed to each other in a state where the slidable member of the attachment member is in contact with the receiver,
the protector includes a lock protrusion that is locked to the slidable member from a side to prevent the slidable portion from coming loose from the slide supporting portion in a state where the slidable member is in contact with the receiver,
the slide supporting portion includes at least one of a pair of edge portions that are located opposite to each other with respect to a slit that extends in the first direction,
the slidable portion constitutes a recessed groove that is recessed so as to allow one of the pair of edge portions to pass therethrough, and includes at least one of a pair of slidable side walls that are provided on both sides of the recessed groove, and
at least one slidable side wall of the pair of slidable side walls of the slidable portion is formed such that a base end-side portion of the slidable side wall is thinner than a leading end-side portion of the slidable side wall (excluding a portion having a shape with which the width increases in a direction toward a leading end side), and the lock protrusion is locked to the slidable member in a state where the at least one slidable side wall of the pair of slidable side walls of the slidable portion has moved past the lock protrusion.

7. A protector-equipped wire harness comprising:
an electrical wire;
a protector that includes a plate-shaped portion, a slide supporting portion formed so as to extend inward in a first direction from one edge portion of the plate-shaped portion, and a receiver that is provided on a far side with respect to the slide supporting portion, the slide supporting portion including a pair of edge portions that are located opposite to each other with respect to a slit that extends in the first direction, the protector being disposed so as to cover at least a portion of an outer circumferential surface of the electrical wire; and
an attachment member that includes a slidable member that is provided with a pair of recessed grooves that allow the pair of edge portions to pass therethrough, and includes a slidable portion supported by the slide supporting portion so as to be slidable in the first direction, the attachment member being provided with a harness-related component or a component attachment portion for a harness-related component,
wherein the protector and the attachment member are fixed to each other in a state where the slidable member of the attachment member is in contact with the receiver,
the protector includes a bottom and a pair of side walls that protrude from the bottom, at least one of the pair of side walls serves as the plate-shaped portion on which the slide supporting portion is provided so as to extend in the first direction from a leading end-side portion of the side wall toward the side wall, and the electrical wire is disposed in a groove that is defined by the bottom and the pair of side walls,
the protector further includes a lid that covers the groove from a side that is opposite to the bottom side with respect to the groove, and
the lid includes a gripping portion that sandwiches the pair of edge portions from an inner surface side and an outer surface side of the side wall.

8. A protector-equipped wire harness comprising:
an electrical wire;
a protector that includes a plate-shaped portion, a slide supporting portion formed so as to extend inward in a first direction from one edge portion of the plate-shaped portion, and a receiver that is provided on a far side with respect to the slide supporting portion, the protector being disposed so as to cover at least a portion of an outer circumferential surface of the electrical wire; and
an attachment member that includes a slidable member that includes a slidable portion supported by the slide supporting portion so as to be slidable in the first direction, the attachment member being provided with a harness-related component or a component attachment portion for a harness-related component,
wherein the protector and the attachment member are fixed to each other in a state where the slidable member of the attachment member is in contact with the receiver,
the slide supporting portion includes at least one of a pair of edge portions that are located opposite to each other with respect to a slit that extends in the first direction,
the slidable portion constitutes a recessed groove that is recessed so as to allow one of the pair of edge portions to pass therethrough, and includes at least one of a pair of slidable side walls that are provided on both sides of the recessed groove, the protector includes a bottom and a pair of side walls that protrude from the bottom, at least one of the pair of side walls serves as the plate-shaped portion on which the slide supporting portion is provided so as to extend in the first direction from a leading end-side portion of the side wall toward the side wall, and the electrical wire is disposed in a groove that is defined by the bottom and the pair of side walls, the protector further includes a lid that covers the groove from a side that is opposite to the bottom side with respect to the groove, the lid includes a gripping portion that sandwiches the pair of edge portions from an inner surface side and an outer surface side of a side wall, and the gripping portion includes a contact portion that sandwiches the slidable member between the contact portion and the receiver.

9. A protector-equipped wire harness comprising:

an electrical wire;

a protector that includes a plate-shaped portion, a slide supporting portion formed so as to extend inward in a first direction from one edge portion of the plate-shaped portion, and a receiver that is provided on a far side with respect to the slide supporting portion, the protector being disposed so as to cover at least a portion of an outer circumferential surface of the electrical wire; and an attachment member that includes a slidable member that includes a slidable portion having a recessed groove and supported by the slide supporting portion so as to be slidable in the first direction, the attachment member being provided with a harness-related component or a component attachment portion for a harness-related component, wherein the protector and the attachment member are fixed to each other in a state where the slidable member of the attachment member is in contact with the receiver, the harness-related component is a connector, the attachment member is provided with the connector or a component attachment portion that is attachable to the connector, the connector is provided on a portion of the slidable member, the portion facing toward the inside of the protector, the slide supporting portion includes at least one of a pair of edge portions that are located opposite to each other with respect to a slit that extends in the first direction, and the recessed groove of the slidable portion is configured to allow one of the pair of edge portions to pass therethrough, and includes at least one of a pair of slidable side walls that are provided on both sides of the recessed groove.

* * * * *